US010509124B2

(12) United States Patent
DeSilva et al.

(10) Patent No.: US 10,509,124 B2
(45) Date of Patent: Dec. 17, 2019

(54) METHOD FOR ESTIMATING TIME OF FLIGHT FOR ACOUSTIC PYROMETRY

(71) Applicant: Siemens Energy, Inc., Orlando, FL (US)

(72) Inventors: Upul P. DeSilva, Oviedo, FL (US); Heiko Claussen, North Brunswick, NJ (US); Karthik Ragunathan, Bangalore (IN)

(73) Assignee: SIEMENS ENERGY, INC., Orlando, FL (US)

( * ) Notice: Subject to any disclaimer, the term of this patent is extended or adjusted under 35 U.S.C. 154(b) by 818 days.

(21) Appl. No.: 15/057,520

(22) Filed: Mar. 1, 2016

(65) Prior Publication Data

US 2016/0299225 A1   Oct. 13, 2016

Related U.S. Application Data

(63) Continuation-in-part of application No. 14/682,393, filed on Apr. 9, 2015, now Pat. No. 10,041,859.

(51) Int. Cl.
*G01S 15/58* (2006.01)
*G01K 11/24* (2006.01)
(Continued)

(52) U.S. Cl.
CPC .............. *G01S 15/586* (2013.01); *F02C 9/26* (2013.01); *G01F 1/668* (2013.01); *G01K 11/24* (2013.01);
(Continued)

(58) Field of Classification Search
CPC ......... G01S 15/586; F02C 9/26; G01K 13/02; G01K 11/24; G01K 2213/00; G01K 2213/024; G01F 1/668; G01M 15/14
See application file for complete search history.

(56) References Cited

U.S. PATENT DOCUMENTS 7,853,433 B2   12/2010   He et al.
2007/0209434 A1*   9/2007   Peters .................. G01F 23/2962
                                                        73/290 V
(Continued)

FOREIGN PATENT DOCUMENTS

WO   WO2015164313 A1   10/2015
WO   WO2015164466 A1   10/2015

OTHER PUBLICATIONS

John A. Kleppe, Jim Maskaly and Gary Beam, "The Application of Image Processing to Acoustic Pyrometry," Proceedings, Int'l Conf. on Image Processing (IEEE) (1996).
(Continued)

*Primary Examiner* — Regis J Betsch
*Assistant Examiner* — Jeremy A Delozier

(57) ABSTRACT

A method for estimating a time of flight of an acoustic signal in a hot gas flow path having background noise wherein a plurality of transceivers each generate an acoustic signal. The method includes providing an acoustic signal of interest that travels in a direction opposite a reference acoustic signal on a first acoustic path between a pair of transceivers. The method also includes identifying at least one minimum peak height in the acoustic signal of interest having a peak height that is greater than the background noise. Further, the method includes obtaining time of flight information of other acoustic paths having substantially the same path length as the first path to provide a range of time of flights wherein a time of flight that falls within the time of flight range and is associated with a minimum peak height forms the estimated time of flight.

16 Claims, 25 Drawing Sheets

(51) Int. Cl.
  G01M 15/14 (2006.01)
  G01K 13/02 (2006.01)
  G01F 1/66 (2006.01)
  F02C 9/26 (2006.01)

(52) U.S. Cl.
  CPC ............ G01K 13/02 (2013.01); G01M 15/14 (2013.01); *G01K 2013/024* (2013.01); *G01K 2213/00* (2013.01)

(56) References Cited

U.S. PATENT DOCUMENTS

| | | | |
|---|---|---|---|
| 2010/0076698 A1* | 3/2010 | He | F23N 5/242 702/35 |
| 2012/0150413 A1* | 6/2012 | Bunce | F02C 9/28 701/100 |
| 2014/0064326 A1* | 3/2014 | Claussen | G01K 13/02 374/117 |
| 2014/0278200 A1 | 9/2014 | DeSilva | |
| 2015/0063411 A1 | 3/2015 | DeSilva et al. | |
| 2015/0168190 A1 | 6/2015 | DeSilva et al. | |
| 2015/0168228 A1 | 6/2015 | DeSilva | |
| 2015/0168229 A1 | 6/2015 | DeSilva | |
| 2015/0168230 A1* | 6/2015 | DeSilva | G01K 11/24 374/117 |
| 2015/0260557 A1 | 9/2015 | DeSilva et al. | |
| 2015/0260611 A1 | 9/2015 | DeSilva et al. | |
| 2015/0260612 A1 | 9/2015 | DeSilva et al. | |

OTHER PUBLICATIONS

G.Q. Shen, L.S.An, and G.S. Jiang, "Real-time Monitoring on Boiler Combustion Based on Acoustic Measurement", Power India Conference, (IEEE) (2006).

Helmut Sielschott and Willy Derichs, "Use of collocation methods under inclusion of a priori information in acoustic pyrometry", Process Tomography—95 Implementation for Industrial Processes, Proc. European Concerted Action on Process Tomography, Bergen, Norway, Apr. 6-8, 1995.

Sanjeev Dhull, Sandeep Arya, O.P. Sahu, "Comparison of Time-Delay Estimation Techniques in Acoustic Environment", International Journal of Computer Applications (0975-8887), vol. 8—No. 9, Oct. 2010, pp. 29-31.

Huang, Y., Benesty, J., Elko, G.W., "Adaptive eigenvalue decomposition algorithm for passive acoustic source localization", J. Acoust. Soc. Am. 107(1), Jan. 2000.

* cited by examiner

METHOD FOR ESTIMATING TIME OF FLIGHT FOR ACOUSTIC PYROMETRY

CROSS-REFERENCE TO RELATED APPLICATIONS

This application is a continuation in part of copending United States patent application entitled "PARAMETER DISTRIBUTION MAPPING IN A GAS TURBINE ENGINE", filed on Apr. 9, 2015, U.S. application Ser. No. 14/682,393, which is incorporated herein by reference in its entirety and to which this application claims the benefit of priority.

This application incorporates by reference the following co-pending United States utility patent applications in their entirety as if fully set forth herein:
"Nonintrusive Performance Measurement of a Gas Turbine Engine in Real Time", filed on Jul. 28, 2014, Ser. No. 14/341,950; Publication No. US2015/0260557;
"Nonintrusive Transceiver and Method for Characterizing Temperature and Velocity Fields in a Gas Turbine Combustor", filed on Jul. 28, 2014, Ser. No. 14/341,924; Publication No. US2015/0260611;
"Active Measurement Of Gas Flow Temperature, Including In Gas Turbine Combustors", filed on Mar. 13, 2014, Ser. No. 14/207,741; Publication No. US2015/0168230;
"Active Temperature Monitoring In Gas Turbine Combustors", filed on Dec. 18, 2013, Ser. No. 14/132,001; Publication No. US2015/0168229;
"Multi-Functional Sensor System For Gas Turbine Combustion Monitoring And Control" filed on Dec. 18, 2013, Ser. No. 14/109,992; Publication No. US2015/0168228;
"Temperature Measurement In A Gas Turbine Engine Combustor", filed on Mar. 14, 2013, Ser. No. 13/804,132; Publication No. US2014/0278200;
"Gas Turbine Engine Control Using Acoustic Pyrometry", filed on Dec. 14, 2010, Ser. No. 12/967,148, Publication No. US2012/0150413;
"Noise Robust Time of Flight Estimation For Acoustic Pyrometry", filed on Aug. 7, 2013, Ser. No. 13/961,292, Publication No. US 2014/0064326.

This application also incorporates by reference in its entirety as if fully set forth herein U.S. Pat. No. 7,853,433, "Combustion Anomaly Detection Via Wavelet Analysis Of Dynamic Sensor Signals", issued Dec. 14, 2010.

This application also incorporates by reference in its entirety as if fully set forth herein International Publication No. WO 2015/164313A1 entitled "Method for Determining Waveguide Temperature for Acoustic Transceiver Used in a Gas Turbine Engine"; and International Publication No. WO 2015/164466A1 entitled "Method for Optimizing Base Points Used in Temperature Mapping of a Turbine Hot Gas Flow Path by Determining Acoustic Signal Intersection Points."

BACKGROUND OF THE INVENTION

1. Field of the Invention

The invention relates to acoustic temperature and velocity mapping, and more particularly, to a method for estimating a time of flight in a hot gas flow path having background noise wherein the method includes providing an acoustic signal of interest that travels in a direction opposite a reference acoustic signal on a first acoustic path between a pair of transceivers, identifying at least one minimum peak height in the acoustic signal of interest having a peak height that is greater than the background noise and obtaining time of flight information of other acoustic paths having substantially the same path length as the first path to provide a range of time of flights wherein a time of flight that falls within the time of flight range and is associated with a minimum peak height forms the estimated time of flight.

2. Description of the Prior Art

Combustion turbines, such as gas turbine engines for any end use application, generally comprise a compressor section, a combustor section, a turbine section and an exhaust section. In operation, the compressor section inducts and compresses ambient air. The combustor section generally may include a plurality of combustors for receiving the compressed air and mixing it with fuel to form a fuel/air mixture. The fuel/air mixture is combusted by each of the combustors to form a hot working gas that may be routed to the turbine section where it is expanded through alternating rows of stationary airfoils and rotating airfoils and used to generate power that can drive a rotor. The expanding gas exiting the turbine section can be exhausted from the engine via the exhaust section.

Combustion anomalies, such as flame flashback, have been known to occur in combustion sections of gas turbine engines. Flame flashback is a localized phenomenon that may be caused when a turbulent burning velocity of the air and fuel mixture exceeds an axial flow velocity in the combustor assembly, thus causing a flame to anchor onto one or more components in/around the combustor assembly, such as a liner disposed around the combustion chamber. The anchored flame may burn through the components if a flashback condition remains for extended periods of time without correction thereof. Thus, flame flashback and/or other combustion anomalies may cause undesirable damage and possibly even destruction of combustion engine components, such that repair or replacement of such components may become necessary.

The fuel/air mixture at the individual combustors is controlled during operation of the engine to maintain one or more operating characteristics within a predetermined range, such as, for example, to maintain a desired efficiency and/or power output, control pollutant levels, prevent pressure oscillations and prevent flameouts. In a known type of control arrangement, a bulk turbine exhaust temperature may also be monitored as a parameter that may be used to monitor the operating condition of the engine. For example, a controller may monitor a measured turbine exhaust temperature, and a measured change in temperature at the exhaust may result in the controller changing an operating condition of the engine. In other known types of control arrangements discrete pitot-static or multi hole pressure probes are utilized to determine gas flow velocity at specific locations, but grid arrays of such probes disrupt gas flow and introduce measurement errors. Due to such gas flow disruptions, grid arrays, when employed, have limited numbers of widely spaced probes, which provide relatively coarse gas flow velocity distribution and profile information.

At present, there are several different types of sensors and sensing systems that are being used in the industry for monitoring combustion and maintaining stability of the combustion process for engine protection. For example, dynamic pressure sensors are being used for combustion stability and resonance control. Passive visual (optical visible light and/or infrared spectrum) sensors, ion sensors and Geiger Mueller detectors are used to detect flame on/off in the combustor, while thermocouples are being used for flashback detection. With respect to known combustion gas flow velocity (u) monitoring methods, pitot-static and multi hole pressure probes utilize differential pressure techniques, hot wire probes utilize thermal anemometry techniques, while Laser Doppler and Particle Image Velocimetry systems utilize optical techniques to characterize gas flow velocities. Differential pressure and thermal anemometry instruments are intrusive point measurement devices that disturb local gas flow around the instruments. Laser Doppler and Particle Image Velocimetry instruments respectively provide non-intrusive point and 2- or 3-dimensional non-intrusive gas flow velocity measurement although they both require particle seeding of the flow. In addition, sophisticated laser based measurements such as Filtered Rayleigh Scattering (FRS) and other such laser spectroscopy based techniques have been deployed to measure gas velocity. However, these techniques are more complex than intrusive differential pressure or thermal anemometry instruments and require more specialized training to implement in monitoring systems. Moreover, most optical techniques for velocity are geared towards laboratory environments rather than in operative engines at power plant field sites. With respect to temperature (T) monitoring techniques, known Raman Spectroscopy, Laser Induced Fluorescence (for both u and T monitoring), and Coherent Anti-Stokes Raman Spectroscopy (CARS) (for both u and T monitoring) instrumentation systems are also intended for laboratory environments, rather than for field use in fossil power generation equipment. Tunable Diode Laser Absorption Spectroscopy (TDLAS) instrumentation is used in some industrial power generation field applications, such as for temperature measurement in boilers but that instrumentation is extremely costly: approximately US $500,000 per system. Other types of temperature measurement and combustion anomaly detection systems have had greater acceptance in power generation industry field applications.

Particularly, U.S. Pat. No. 7,853,433 detects and classifies combustion anomalies by sampling and subsequent wavelet analysis of combustor thermoacoustic oscillations representative of combustion conditions with sensors, such as dynamic pressure sensors, accelerometers, high temperature microphones, optical sensors and/or ionic sensors. United States Publication No. US2012/0150413 utilizes acoustic pyrometry in an IGT exhaust system to determine upstream bulk temperature within one or more of the engine's combustors. Acoustic signals are transmitted from acoustic transmitters and are received by a plurality of acoustic receivers. Each acoustic signal defines a distinct line-of-sound path between a corresponding transmitter and receiver pair. Transmitted signal time-of-flight is determined and processed to determine a path temperature. Multiple path temperatures can be combined and processed to determine bulk temperature at the measurement site. The determined path or bulk temperature or both can be utilized to correlate upstream temperature in the combustor. Co-pending United States utility patent application No. Ser. No. 13/804,132 calculates bulk temperature within a combustor, using a so-called dominant mode approach, by identifying an acoustic frequency at a first location in the engine upstream from the turbine (such as in the combustor) and using the frequency for determining a first bulk temperature value that is directly proportional to the acoustic frequency and a calculated constant value. A calibration second temperature of the working gas is determined in a second location in the engine, such as the engine exhaust. A back calculation is performed with the calibration second temperature to determine a temperature value for the working gas at the first location. The first temperature value is compared to the back calculated temperature value to change the calculated constant value to a recalculated constant value. Subsequent first temperature values at the combustor may be determined based on the recalculated constant value.

An acoustic pyrometry technique is used to measure temperature and mass flow in real time in extreme environments such as that found in a gas turbine exhaust or in gas turbine combustors. In particular, this technique is based on continuously finding the time of flight of acoustic waves traveling across a cross section or a volume which has flow. A method for determining time of flight includes estimating a time delay (i.e. time delay estimate or TDE) between a transmitted and a received signal by using a generalized cross correlation method (GCC). However, due to high background noise, airflow and the level of vibration that exists in a gas turbine engine and the ever changing and extreme nature of the environment therein, a large uncertainty can be observed in the detected time of flights of the acoustic waves. This, in turn, introduces a large error into the measured quantities of temperature and velocity. It has been found that alternative techniques such as Generalized Cross Correlation with Phase Transform (GCC-PHAT) and Generalized Cross Correlation-Smoothed Coherence Transform (GCC-SCOT), which utilize a weightage factor in addition to standard GCC, do not provide satisfactory results when compared to standard GCC under extreme noise conditions such as those found in a gas turbine exhaust. Further, Eigen Value decomposition based TDE and Fractional Fourier Transform based TDE are computationally intensive and do not provide better results as compared to GCC under extreme noise and high temperature conditions.

SUMMARY OF THE INVENTION

A method is disclosed for estimating a time of flight of an acoustic signal in a hot gas flow path having background noise wherein a plurality of transceivers each generate an acoustic signal. The method includes providing an acoustic signal of interest that travels in a direction opposite a reference acoustic signal on a first acoustic path between a pair of transceivers. The method also includes identifying at least one minimum peak height in the acoustic signal of interest having a peak height that is greater than the background noise. Further, the method includes obtaining time of flight information of other acoustic paths having substantially the same path length as the first path to provide a range of time of flights wherein a time of flight that falls within the time of flight range and is associated with a minimum peak height forms the estimated time of flight.

The respective objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
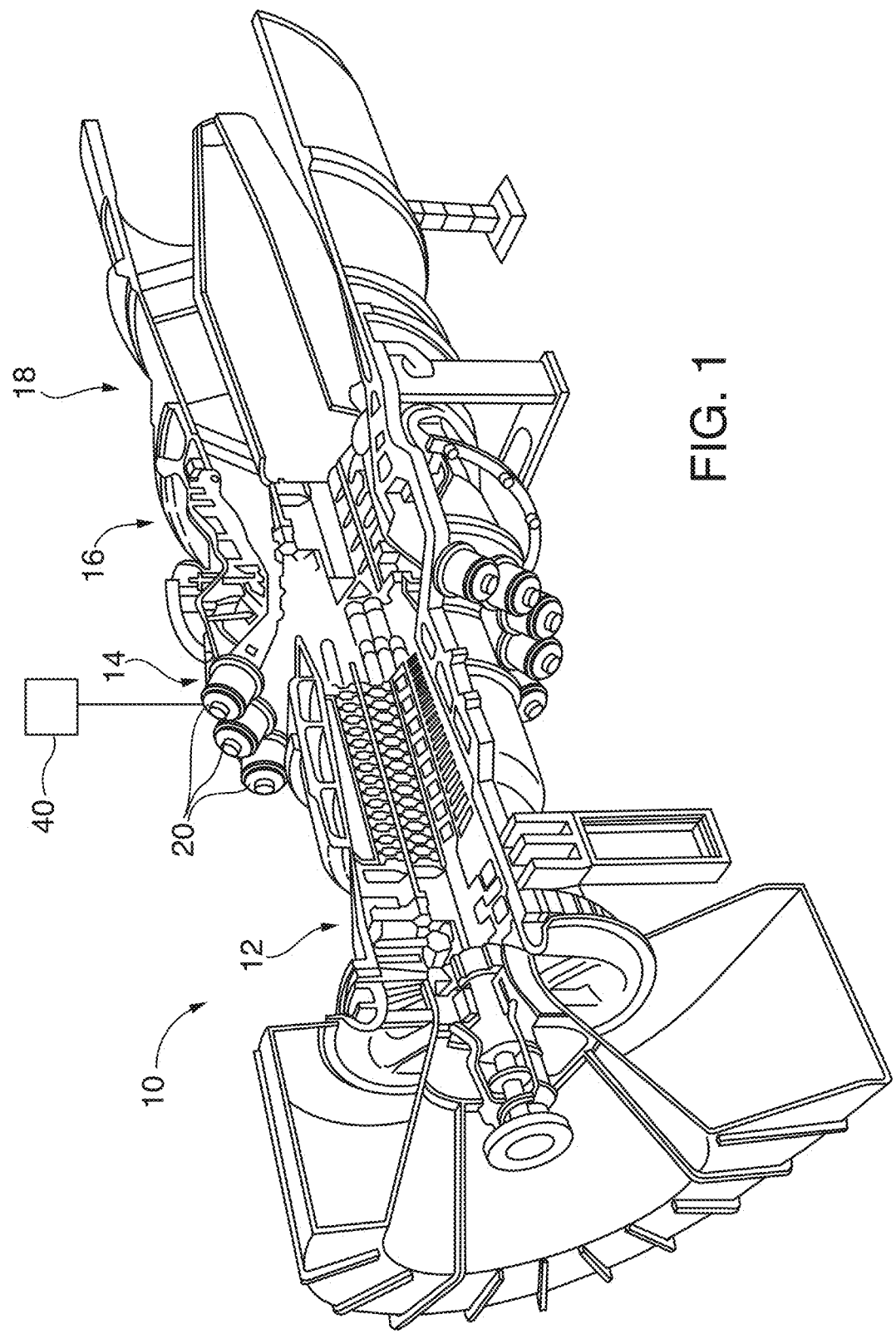
FIG. 1 is a perspective cross-sectional view of a gas turbine engine illustrating implementation of a system for determining combustor gas flow active velocity and temperature measurement, in accordance with embodiments of the invention.

After considering the following description, those skilled in the art will clearly realize that the teachings of the invention can be readily utilized for active acoustic velocity and pyrometry-based gas flow velocity and temperature measurement. Embodiments of the invention are used for monitoring of gas turbine combustors, including industrial gas turbine (IGT) combustors by incorporating them into the combustion monitoring and control system by addition of an acoustic transmitter or acoustic transceiver that transmits sound waves through gas flow in a line-of-sight with a plurality of acoustic sensors, such as dynamic pressure sensors. For velocity measurement, sound transmission time-of-flight that is directed generally transversely through the gas flow path is measured by the controller and correlated with gas flow velocity along the line-of-sight. The gas flow velocity determination includes compensation for impact of the thermodynamically interrelated temperature, gas constant and speed of sound influences on the first time-of-flight, in order to determine absolute gas flow velocity.

In an integrated acoustic pressure-based sensor and monitoring/control system embodiment, the controller correlates velocity and, if desired, absolute active path temperatures simultaneously with acoustic transmission and time-of-flight analysis techniques. Where velocity and temperature are measured simultaneously the absolute active path temperature is utilized to compensate for the aforementioned thermodynamic influences on gas flow absolute velocity. Alternatively in other embodiments the speed of sound influence on the first time-of-flight is utilized to determine absolute gas flow velocity rather than absolute active path temperature. In such embodiments, compensation for the speed of sound in the velocity monitoring is accomplished by substituting for the first transmitters a set of first transceiver/transducers that are capable of transmitting and receiving acoustic signals, and generating output signals and substituting for the first sensors a set of second transducers that are capable of transmitting and receiving acoustic signals and generating output signals. Acoustic signals are transmitted and received from the first to the second transducers and time-of-flight is determined. A reverse acoustic signal is transmitted from the second to the first transducers and the reverse time-of-flight is determined. The respective first and first reversed acoustic signals times-of-flight are used to determine the speed of sound c. The determined speed of sound c is then utilized for determination of the actual gas flow velocity.

In embodiments of the invention active velocity or active velocity/temperature measurements are used as monitoring parameters for gas flow in a combustion monitoring and control system that can identify and classify gas flow anomalies (e.g., combustion anomalies), for example by using wavelet or Fourier analysis techniques. Some embodiments of the methods and system incorporate one or more acoustic dynamic pressure transceiver/transducer combination transmitter/sensors that are selectively oriented or arrayed in sequential axial planar positions within the combustor. Known transceiver/transducer component designs and their related controller components have been used reliably and cost effectively in the past in power generation field service. By reconfiguring those types of known components into the gas flow control and monitoring systems of the present invention combustion turbine and other combustion power generation equipment can be monitored and controlled with simpler instrumentation hardware configurations that provide detailed active gas flow velocity and temperature distribution information useful for precise combustion control.

Monitoring and Control System Structure

Figure 2:
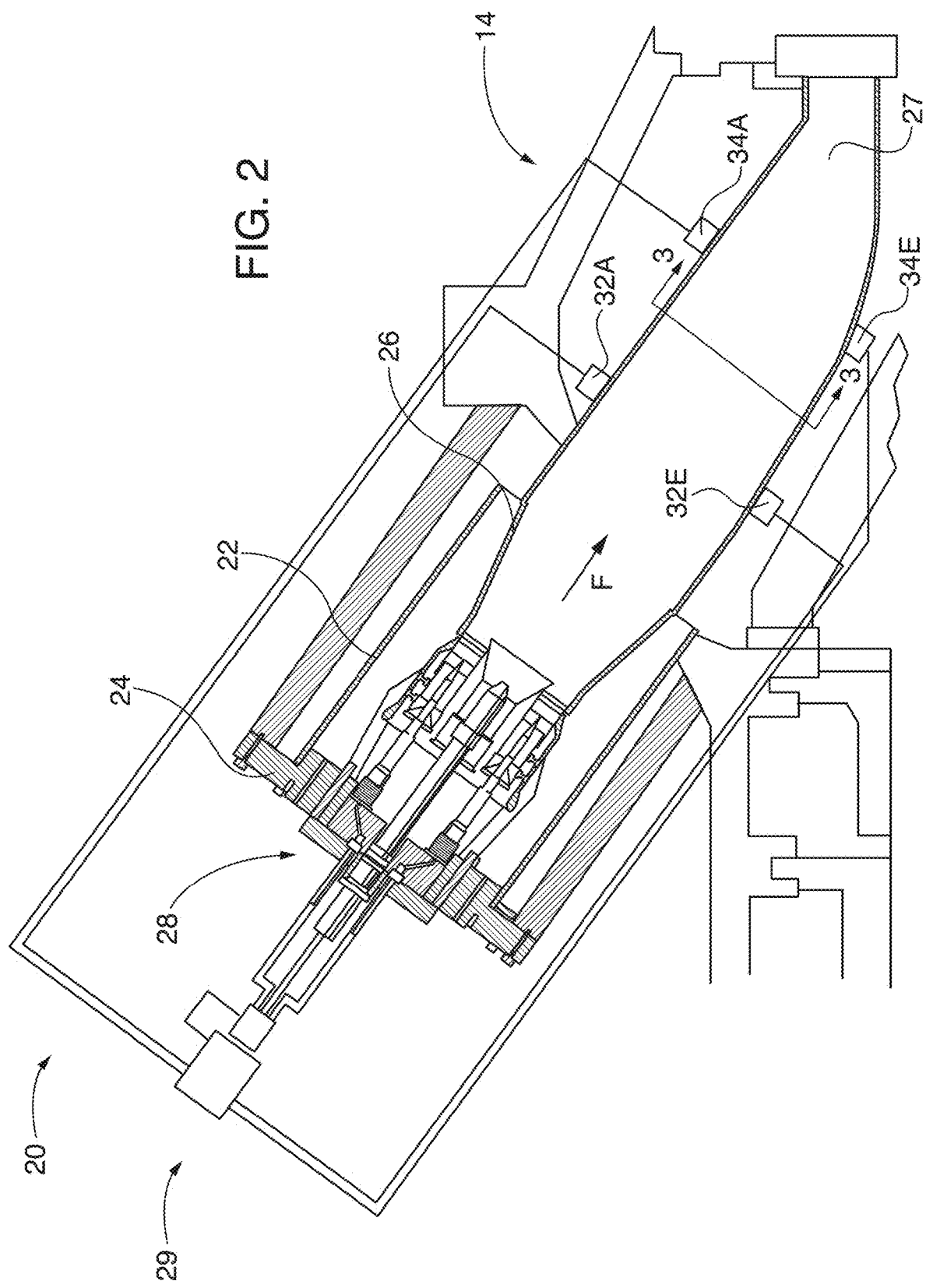
FIG. 2 is a cross-sectional view of a gas turbine combustor incorporating an embodiment of a monitoring system for determining combustor gas flow active velocity and temperature measurement, in accordance with embodiments of the invention.

Referring to FIGS. 1 and 2 an exemplary industrial gas turbine engine 10 is shown. The exemplary engine 10 includes a compressor section 12, a combustor section 14, a turbine section 16, and an exhaust section or system 18. The combustor section 14 includes a plurality of combustors 20. Each combustor 20 has a combustion shell 22 and a cover plate 24. The combustor liner or basket 26 and transition duct 27 define a passage for conveying hot working gas that flows in the direction F to the turbine section 16. The system of the present invention is operable with known combustor geometry gas turbine engine designs, including can, can-annular or annular construction combustors in stationary land-based or vehicular applications.

During operation of the engine 10, compressed air from the compressor section 12 is provided to the combustor section 14 where it is combined with fuel supplied by fuel injection system 28 in the combustors 14. The fuel/air mixture is ignited to form combustion products comprising the hot working gas. It may be understood that combustion of the fuel and air may occur at various axial locations along the passage through the combustor liner or basket 26 and the transition duct 27 to the inlet of the turbine section 16. The hot working gas is expanded through the turbine section 16 and is exhausted through the exhaust section/system 18.

Referring to FIGS. 1 and 2, in accordance with an aspect of the invention, a combustion monitoring and control system 29 is provided, which can identify and classify combustion anomalies and actively control the gas turbine combustion process within one or more of the engine 10 combustors 20. In this regard, the engine 10 may include may comprise one or more of the monitoring and control system(s) 29: e.g., one system 29 for each combustor 20, or a single system 29 may service each combustor 14 of the engine 10. Similarly, clusters of combustors 20 may be served by one system 29, with other cluster(s) being served by other systems. Thus the consolidated monitoring system for an engine 10 can determine deviations between respective combustors and compare their relative performance no matter what engine combustor structure or orientation is employed by the engine design: whether a stationary, land-based turbine engine or a vehicular engine for aero, marine or land vehicular applications.

Figure 5:
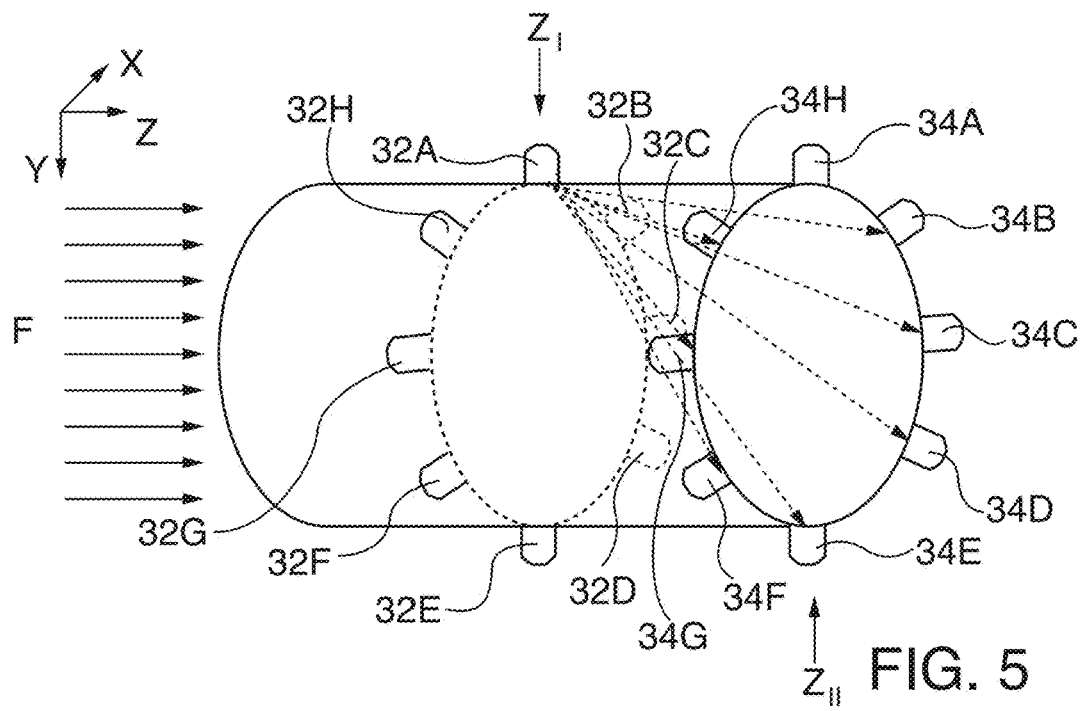
FIG. 5 is a schematic perspective view of exemplary sonic sensor arrays used by the gas flow monitoring system to measure gas flow velocity in a gas turbine combustor, in accordance with embodiments of the invention.
Figure 9:
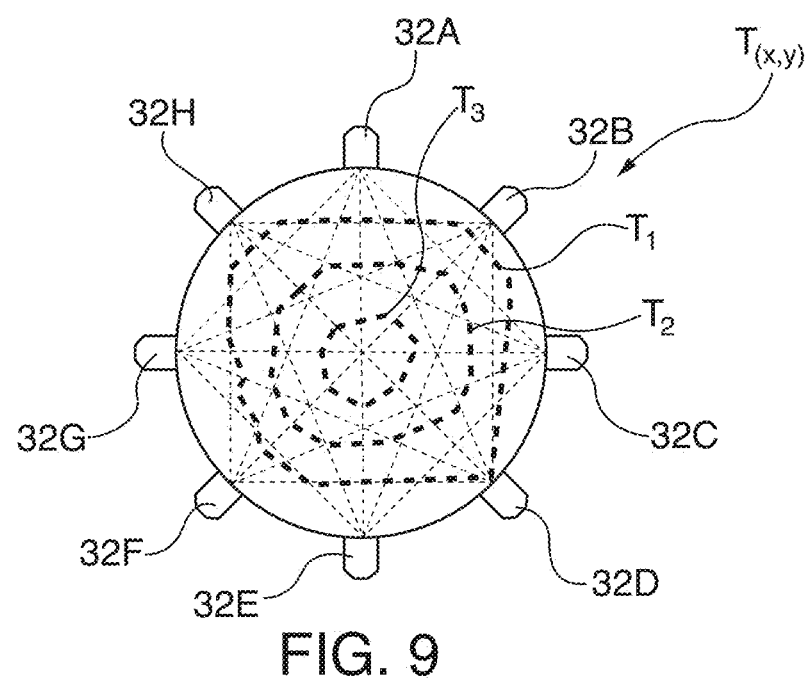
FIG. 9 is a schematic perspective view of exemplary sonic sensor arrays used to measure gas flow temperature in a gas turbine combustor, in accordance with embodiments of the invention.

As shown in FIGS. 2, 3, 5 and 9 the system 29 includes an array of a plurality of known acoustic transceiver/transducers 32A-H and 34A-H that are capable of transmitting and receiving acoustic oscillation waves along exemplary the line-of-sight paths shown in dashed lines in FIGS. 5 and 9. The transceiver/transducer arrays 32, 34 are capable of generating respective sensor output signals indicative of combustion thermoacoustic oscillations in each respective monitored and controlled combustor 20. Other system embodiments can be constructed with at least two, but preferably more acoustic sensors, whether functionally part of a transceiver component or as a stand-alone component. Acoustic frequencies and amplitudes sensed by those acoustic sensor portions of the transceivers are generated as a result of combustion events in the working combustion gas, defining acoustic sources that occur within the combustor 20 hot gas path. The monitoring and control system 29 is configured to transform the sensed thermoacoustic oscillation information into a form that enables the occurrence of combustion anomalies of interest to be discerned. As such, flame flashback events and other types of combustion anomalies of interest may be detected and extracted from sensed thermoacoustic oscillations in the combustor 14 that are monitored by the transceiver/transducer/sensors positioned in and/or around the combustor 14. Depending upon the system 29 configurations and application, the acoustic sensors comprise any combination of one or more of a dynamic pressure sensor, a microphone, an optical sensor or an ionic turbine inlet sensor. Pressure sensors sense the amplitudes of thermoacoustic oscillations in the combustor 20 as well as pulsation frequencies. A high temperature microphone may be utilized to measure acoustic fluctuations in the combustor 14. An optical sensor may be utilized to measure a dynamic optical signal within the combustor 20. An ionic sensor may be utilized to measure dynamic ionic activity within the combustor 20.

Figure 3:
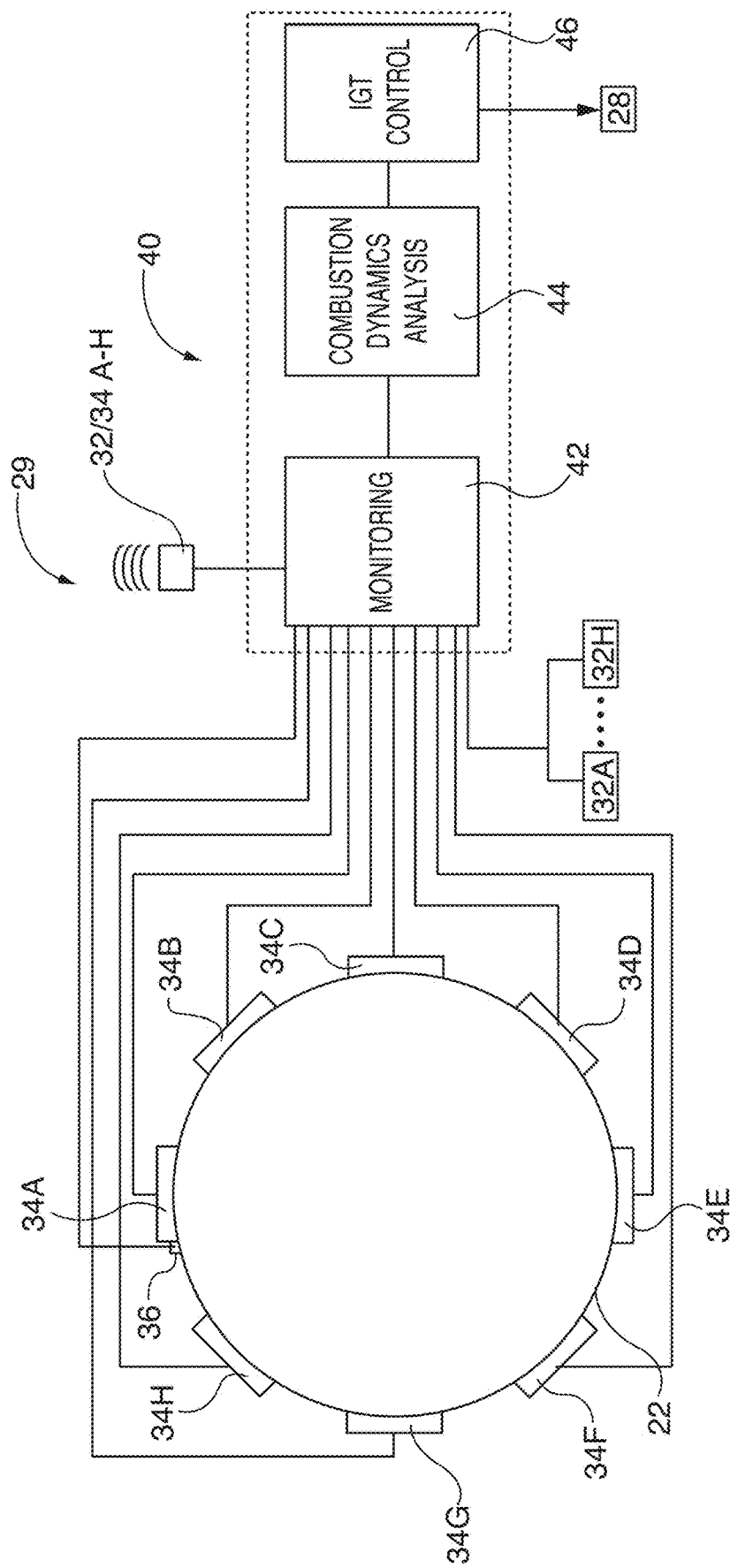
FIG. 3 is a cross-sectional view of the system of FIG. 2, taken along 3-3 thereof, in accordance with aspects of the invention.

An exemplary acoustic sensor array shown schematically in FIGS. 2, 3, 5 and 9 comprises transceiver/transducers 32A-H and 34A-H that function as at least one acoustic transmitter that transmits in turn to at least one and preferably a plurality of the dynamic pressure sensors in the array. The transceiver/transducers 32, 34 are arrayed axially and radially within the combustor 20 by known mounting structures and methods, such as J tubes or rakes, within the combustor shell 22 proximal the combustor basket or liner 26, and/or proximal the transition 27 junction with the turbine section 16. In FIG. 3 the sensors are radially/circumferentially arrayed transceivers 34A-34H that are capable of transmitting and receiving acoustic oscillation waves along the line-of-sight paths similar to the transceivers 32A-H shown in dashed lines in FIG. 9. Other types of known sensors, such as individual thermocouple temperature sensors or thermocouple arrays may be employed within the gas turbine engine. For example in FIG. 3 thermocouple 36 measures combustion temperature in the combustor 20. While exemplary three-dimensional annular combustion flow paths and axially spaced, two-dimensional circular-annular transceiver/transducer arrays are shown in the figures, other combustion flow path and array orientations may be utilized, in practicing embodiments of the invention, including square- or rectangular-shaped geometries.

Figure 4:
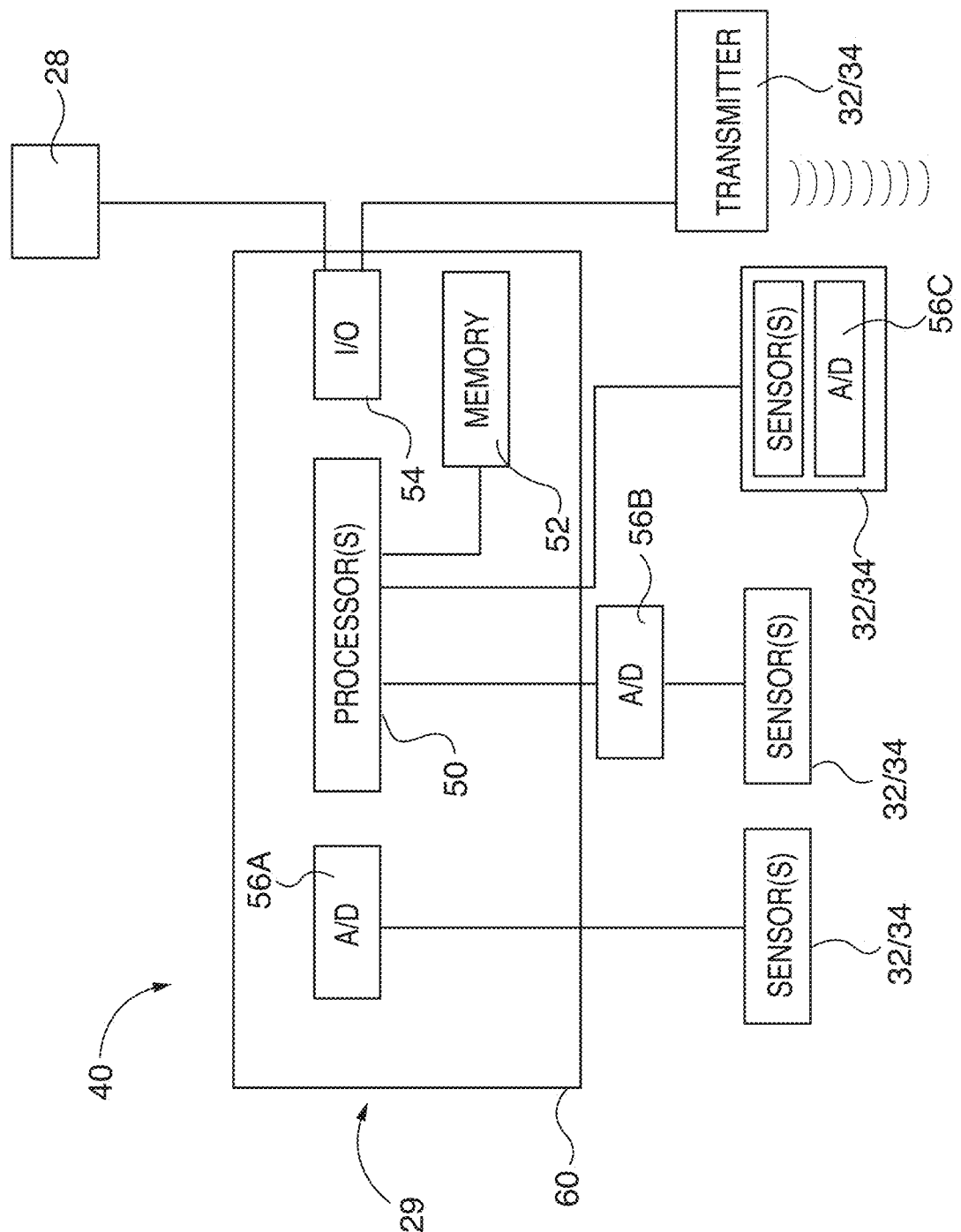
FIG. 4 is a block diagram of an embodiment of a controller for implementing embodiments of the present invention in the monitoring system for determining combustor gas flow active velocity and temperature measurement, in accordance with embodiments of the invention.

As shown in greater detail in FIGS. 3 and 4, the monitoring and control system 29 comprises a known controller 40, coupled to the transceiver/transducers 32, 34, that is capable of correlating sensor output signals with gas flow velocity and combustion temperature in a monitoring section 42 and conducting combustion dynamics analysis of the combustion process in an analysis section 44. The monitoring section 42 and dynamic analysis 44 section outputs are utilized by the gas turbine control system 46 that can send control signals to other gas turbine controls subsystems, including industrial gas turbine (IGT) controls subsystems, such as the fuel injection system 28, in order to unload or shut down the engine 10 in response to changes in monitored combustion conditions within the combustor 20.

Referring to the exemplary controller 40 embodiment shown in FIG. 4, it includes one or more processors 50, system memory 52 and input/output control devices 54 for interfacing with the associated engine 10 controls, such as the fuel injection control system 28, and the acoustic transceiver/transducer 32, 34 acoustic transmitters and sensors 32 (or functionally equivalent performing separate discrete transmitters and receiver sensors), networks, other computing devices, human machine interfaces for operator/users, etc. The controller 40 may also include one or more analog to digital converters 56A and/or other components necessary to allow the controller 40 to interface with the transceivers 32, 34 and/or other system components to receive analog sensor information. Alternatively, and/or additionally, the system 29 may include one or more analog to digital converters 56B that interface between the transceivers 32, 34 (or functionally equivalent performing separate discrete transmitters and receiver sensors) and the controller 40. As yet a further example, certain transceivers 32, 34 may have an analog to digital converter 56C integral therewith, or are otherwise able to communicate digital representations of sensed information directly to the controller 40.

The processor(s) 50 may include one or more processing devices such as a general purpose computer, microcomputer or microcontroller. The processors 50 may also comprise one or more processing devices such as a central processing unit, dedicated digital signal processor (DSP), programmable and/or reprogrammable technology and/or specialized component, such as application specific integrated circuit (ASIC), programmable gate array (e.g., PGA, FPGA).

The memory 52 may include areas for storing computer program code executable by the processor(s) 50, and areas for storing data utilized for processing, e.g., memory areas for computing wavelet transforms, Fourier transforms or other executed mathematical operations used to operate the monitoring and control system 29, as described more fully herein below. As such, various aspects of the present invention may be implemented as a computer program product having code configured to perform the detection of combustion engine anomalies of interest, combustion dynamics and engine control functions as set out in greater detail herein.

In this regard, the processor(s) 50 and/or memory 52 are programmed with sufficient code, variables, configuration files, etc., to enable the controller 40 to perform its designated monitoring and control functions. For example, the controller 40 may be operatively configured to sense thermoacoustic conditions, analyze thermoacoustic conditions based upon inputs from one or more transceiver/transducers 32, 34, control features of the engine 10 in response to its analysis, and/or report results of its analysis to operators, users, other computer processes, etc. as set out in greater detail herein. Thus, all of the dynamic output signals originating from transceiver/transducers 32, 34 may be communicated to a single processor 50. In this implementation, the single processor 50 will process the sensor dynamic output signals using the data analysis and control functions described in greater detail herein, such that it appears as if the results are computed in a generally parallel fashion. Alternatively, more processors 50 can be used and each processor may be utilized to process one or more transceiver/transducers 32, 34 dynamic signals, e.g., depending for example, upon the computation power of each processor.

Monitoring and Control System Operation

Figure 10:
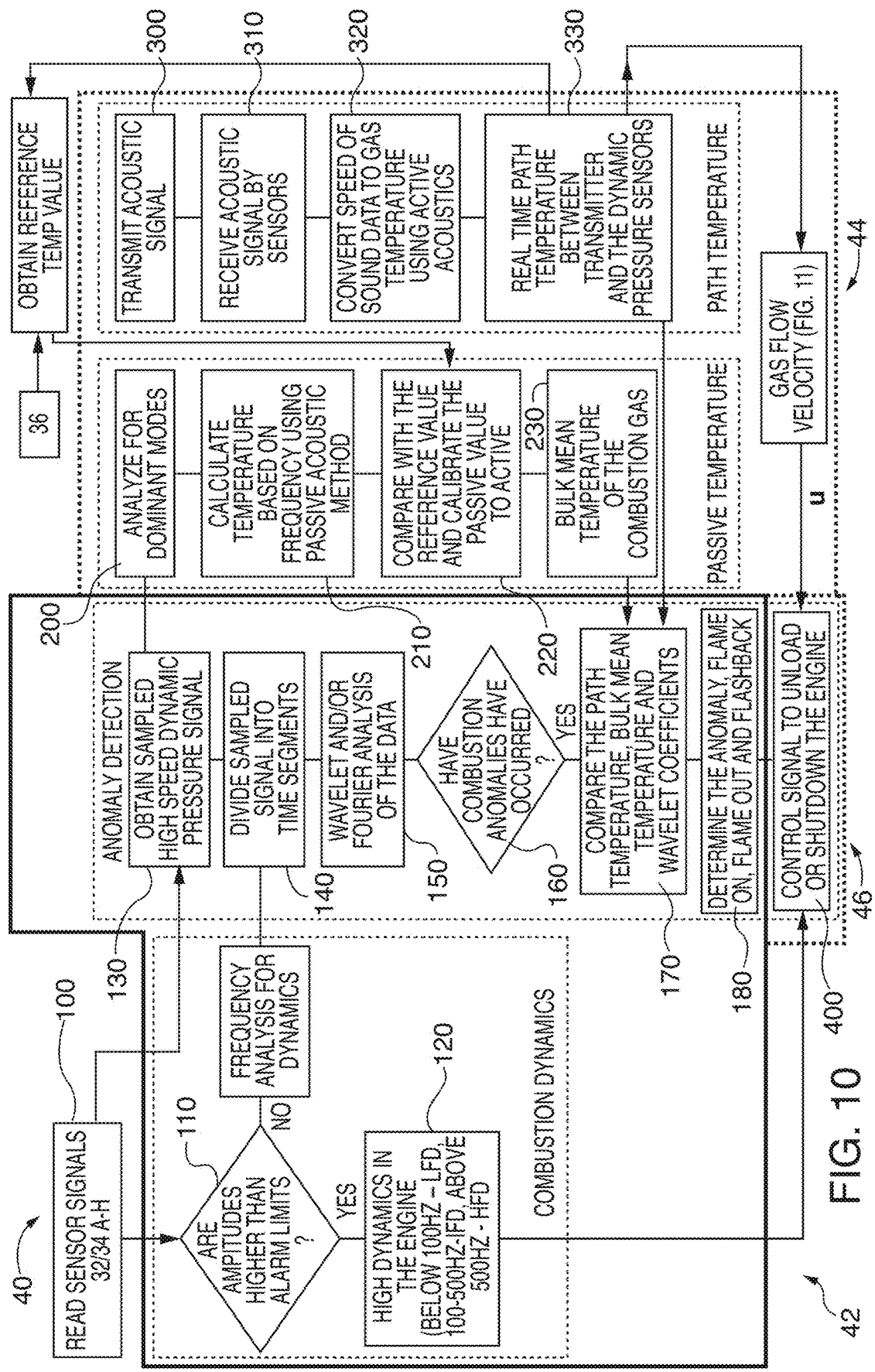
FIG. 10 is a flow chart illustrating implementation of an embodiment of the methods for measuring gas flow velocity and temperature active measurement in a gas turbine combustor, in accordance with embodiments of the invention.
Figure 11:
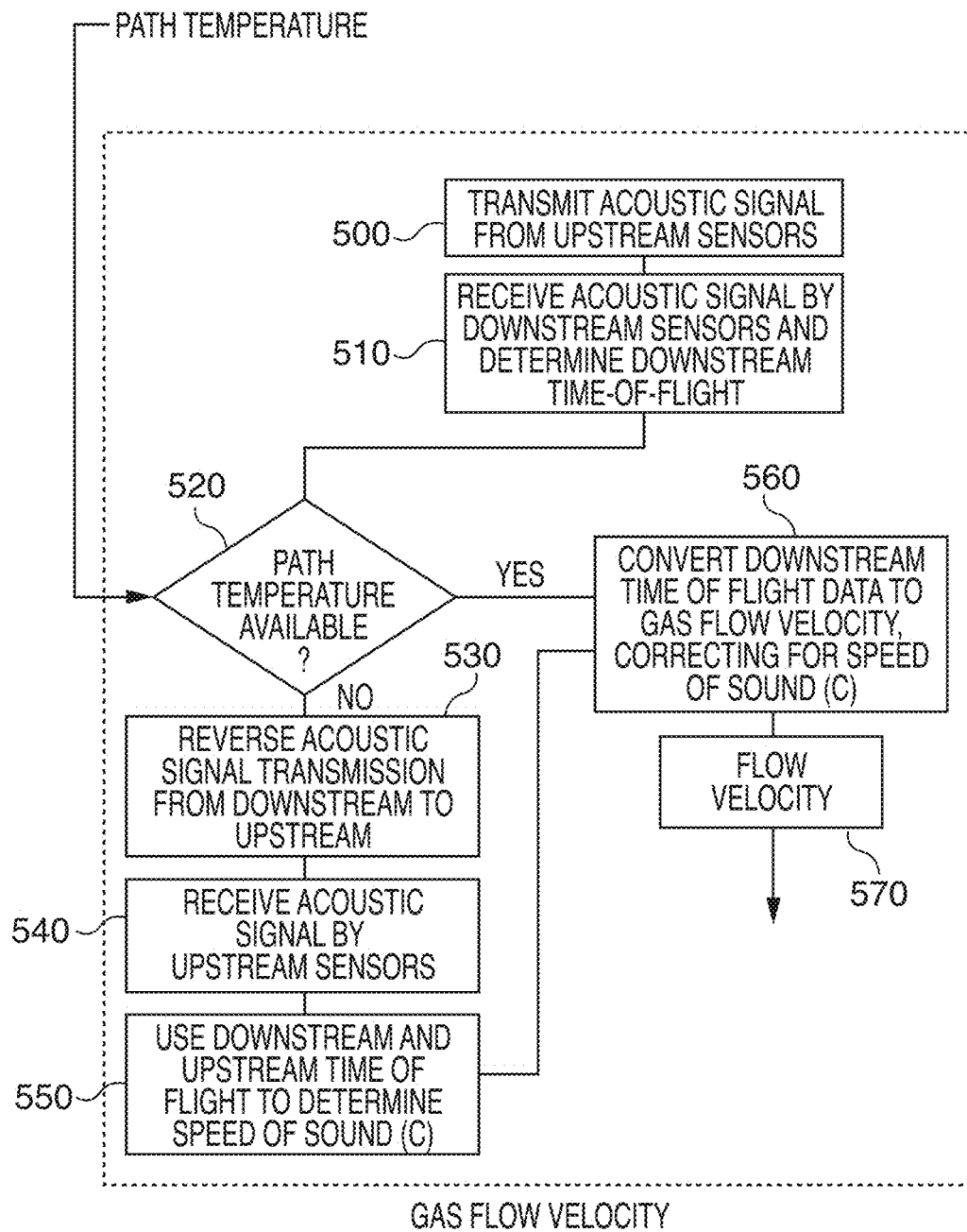
FIG. 11 is a flow chart illustrating implementation of an embodiment of the method for measuring active gas flow velocity, in accordance with embodiments of the invention.

The concepts of acoustic temperature and velocity measurements are both based on creating a sonic wave, listening to it across the gas stream and finding an average speed of sound across a given path, which is then descriptive for the gas velocity or velocity/temperature. FIGS. 10 and 11 are flow charts illustrating graphically exemplary operation of a monitoring and control system 29 embodiment of the invention that actively monitors and measures both gas flow velocity and temperature using acoustic measurement methodologies. The thick solid and dotted line operational blocks relate to previously described combustion dynamics analysis 42 (solid block), temperature monitoring and determination 44 and gas turbine control 46 functions (including by way of example IGT control functions) that are performed within the controller 40. In step 100 sensor signals generated by the sensor components within the transceiver/transducers 32A-H, 34 A-H are read. In step 110 amplitudes of one or more of the sensor signals are compared to previously established alarm limits. For example in IGT applications the step 120 low frequency dynamics (LFD) below 100 Hz are of importance because of potential resonance influence at the 50 Hz or 60 Hz engine rotational speed. Other frequency bands of interest are intermediate frequency dynamics (IFD) between approximately 100-500 Hz and high frequency dynamics (HFD) above 500 Hz. If an alarm limit is exceeded the controller 40 sends a control command, for example to the fuel injection system 28, to unload or shut down the engine 10 in step 400.

If an alarm limit is not exceeded in step 110, then frequency analysis for dynamics is performed in anomaly detection portion of the combustion dynamics analysis sub system. An exemplary description of how to perform anomaly detection is in U.S. Pat. No. 7,853,433 that is incorporated herein by reference. The sampled high speed dynamic pressure signal is obtained from the sensors in step 130 and time divided into segments in step 140. In step 150 the time-frequency divided sample segments are analyzed using the wavelet analysis technique described in U.S. Pat. No. 7,853,433. Alternatively, a known Fourier spectral analysis that converts the time segments into frequency space, analyzes dominant frequencies by identifying the peak frequencies and their respective amplitudes, and identifies amplitudes exceeding defined thresholds. If it is determined that a combustion anomaly or anomalies have occurred in step 160 the combustor temperature as determined in the temperature monitoring and determination subsystem 44 is compared with the anomaly information obtained by the Fourier or wavelet analysis techniques, or both. In step 180 the anomaly classification as a flame on, flame out or flashback is made in conjunction with the passive or path temperature information obtained from the temperature monitoring and determination subsystem 44. For example in a gas turbine flameout the combustor temperature drops off dramatically. Conversely in a flashback scenario the combustor temperature rises dramatically upstream within the combustor 14. When the anomaly determination is made in step 180 appropriate control signals to unload or shut down the engine are made in the engine control system 46.

The temperature monitoring and determination subsystem 44 may comprise passive temperature determination utilizing the passive acoustic method described in United States patent application "Temperature Measurement in a Gas Turbine Engine Combustor, filed on Mar. 14, 2013, Ser. No. 13/804,132, incorporated by reference herein, and/or real time actual path temperature determination within the combustor 14. Real time actual path temperature is determined by adaptation of the 2-D planar acoustic pyrometry technique for gas turbine exhaust system temperature determination described in United States Patent Publication No. US2012/0150413 (also incorporated by reference herein) or by a 3-D technique that determines one or more path temperatures between the sensor arrays 32/34 of FIG. 5, that is further described in greater detail herein.

In the passive temperature determination method, sampled high speed dynamic pressure signals from the transceiver/transducers 32/34, such as obtained in step 130 are analyzed for dominant modes in step 200. Combustor temperature is calculated based on frequency using the passive acoustic method in step 210. The passive value is calibrated with a reference temperature value in step 220 in order to obtain an active temperature value within the combustor 14. The calibrated passive temperature value determined in step 220 is utilized in step 230 to determine the bulk mean temperature of the combustion gas in step 230. The reference temperature value used in step 220 may be obtained from one or more thermocouples 36 in the combustor or thermocouples located in the exhaust system 18 (not shown). The reference temperature value may be an actual path temperature measured in the exhaust system 18, as described in United States Patent Publication No. US2012/0150413 or a real time path temperature measured in the combustor 14 that is determined in steps 300-330.

The 2-D real time path temperature is measured by transmitting one or more acoustic signals in an acoustic transceiver/transducer 32, 34 or other discrete transmitter, such as in the 2-D planar pattern shown for the (n=8+ transceiver/transducers 32A-H in FIG. 9. For example, transceiver/transducer 32A transmits a signal that is received by the remaining (n−1) transceiver/transducers 32B-H and the time-of-flight for each line-of-sight path is determined. However, at least one, preferably two or more sensor elements in the remaining transceiver/transducers 32B-H receive the acoustic signal(s) in step 310. Preferably in practice several transceiver/transducers (transmit and receive acoustic signals) circling one plane such that the paths between all transceivers form a grid with desired coarseness which results in the spatial resolution of the temperature measurement. For example, for a cylindrical combustor the transceivers could be equally spaced around the periphery as shown in FIGS. 3 and 9. These could be either fired sequentially (one at a time) or simultaneously with disjoint sound patterns that can be readily differentiated. For sequential firing one transceiver is creating sounds while all remaining transceivers record it to estimate the travel time for the respective paths. Each of these line-of-sight paths represents an average temperature along that path. The average temperatures over different paths are combined to a two-dimensional map shown in FIG. 9, using a known computer tomography technique.

The 2-D time-of-flight sound data are converted to gas temperature using active acoustics in step 320, such as by utilization of the methods described in the aforementioned United States Patent Publication No. US2012/0150413 that is incorporated by reference herein. The real time path temperature that is determined in step 330 is the localized active temperature value along the line-of-sight transmission path. A plurality of active temperature values measured along different acoustic paths by performing the steps 300-330 can be utilized to determine the combustor 14 bulk temperatures, alone or in parallel with the dominant frequency passive acoustic method of steps 200-230, While a single path active temperature measurement between a single transmitter 30 and acoustic sensor 32 provides useful control information, arraying a plurality of transceiver/transducers 32, 34 selectively in any axial, circumferential and/or radial pattern or combinations thereof within a combustor 14 (see, e.g., FIG. 2, 3, 5, or 9) or in a series of combustors 14 facilitates active real time two or three-dimensional combustion temperature monitoring within the gas turbine engine 10.

The 2-D or 3-D real time path temperature determined in steps 300-330 can be utilized as an input for other monitoring and control functions, with or without one or more of the combustion dynamics analysis 42, passive temperature monitoring and determination 44 and control 46 functions described in the exemplary integrated monitoring and control system 29 described herein. For example combustor turbine inlet temperature (TIT) can be actively monitored in real time and used as a control parameter for the combustion process. The combustion active path temperature determined in steps 300-330 can be utilized to control the fuel/air mixture in the combustor 14 via the fuel injection system 28. The real time path active temperature can be utilized as an input for active actual gas flow velocity measurement in an industrial gas turbine combustor or in other types of gas flow environments.

Embodiments of the present invention measure 3-D gas flow velocity and/or gas flow temperature by correlation with sonic time-of-flight along a line-of-sight sonic pathway between axially spaced, transversely oriented sonic transmitter and sensor (or transceiver/transducers incorporating the sensors and transmitters), so that the line-of-sight along the pathway is oriented transverse, as opposed to parallel to the gas flow path. In order to determine gas flow absolute velocity, the time-of-flight data are corrected or compensated for thermodynamic influences on gas temperature, gas constant and speed of sound. As noted above gas temperature along a line of sight can be determined using the real time active path temperature or temperature independently obtained from another measurement device (e.g., thermocouple 36). Alternatively localized speed of sound c can be determined by measuring bi-directional time-of-flight (i.e., forward/downstream transmission and reverse/upstream transmission). The aforementioned thermodynamic influences are governed by the known equation:

$$c(x,y,z) = (\gamma \cdot R \cdot T)^{1/2}$$

Where:
c(x,y,z) is the isentropic speed of sound;
γ is specific heat ratio;
R is the gas constant; and
T is the gas temperature.

Therefore, once the speed of sound along a path is known, the average path temperature and absolute velocity can be determined utilizing embodiments of the invention further described herein.

For accurate absolute velocity or temperature measurement, two planes of transceiver/transducers 32, 34 are oriented in axially spaced, opposed relationship within the gas flow, as shown in FIG. 5. The two transceiver/transducer planes 32, 34 are preferably apart by approximately the same order of magnitude as the diameter (circular) or width (square or rectangular) of the monitored gas flow geometry, That is, the axial distance between the two planes should be determined according to the geometry and scale of the interrogated environment as well as the anticipated or possible ranges of gas flow gas constant, temperature and velocity.

Figure 8:
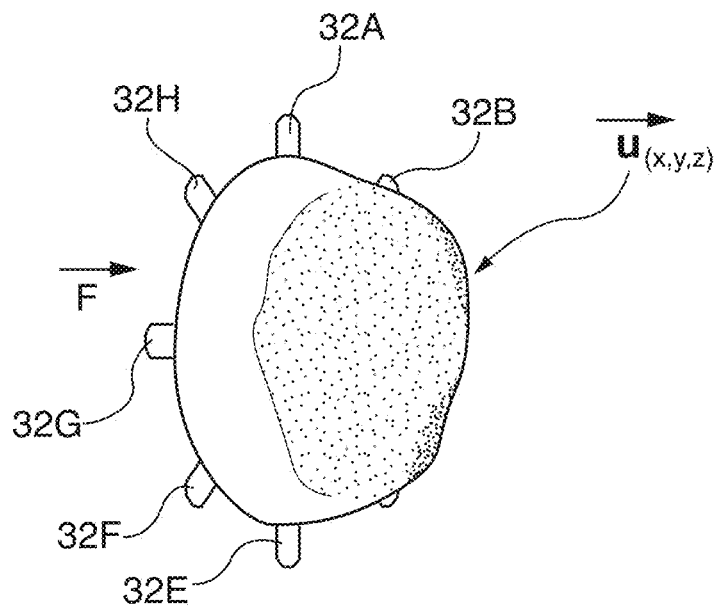
FIG. 8 is a composite gas flow velocity profile of the respective velocities measured by the gas flow velocity monitoring system, in accordance with embodiments of the invention.

For gas flow velocity estimation, the gas flow is measured axially and transverse to the flow direction. For example, when transceiver/transducer 32A in plane $Z_I$ fires or transmits a signal, all transceiver/transducers 34B-14 in plane $Z_{II}$ that are not parallel-aligned with the signal firing sensor will be listening, thereby creating several paths across the gas flow (n–1 paths for n sensors). The signal transmitting/receiving firing process continues sequentially with the second transceiver/transducer 32B on plane $Z_I$ firing to the remaining (n–1) transceiver/transducers 34A and 34C-H, which receive that transmitted signal. The transmitted signal firing will continue on with the consecutive transceivers firing and creating n–1 paths for each firing. In the embodiment of FIG. 5, having 8 transceivers/transducers in each of the two axially spaced arrays there are a total of 64 paths in three dimensions. In addition, to alleviate the directional ambiguity of the velocity (to identify reverse flows and perhaps turbulence fluctuations in reverse direction) the same process will be repeated with transducer/transceivers 34 in plane $Z_{II}$ firing and transceiver/transducers in plane $Z_I$ receiving the reverse direction transmitted acoustic signal, assuming that the gas flow temperature is already known. Instead of transmitting/firing acoustic signals sequentially from each transceiver/transducer, a sound pattern with a slightly different acoustic signature can be transmitted from each respective transceiver/transducer 32A-H, 34A-H simultaneously, which shortens measurement time Referring to steps 500 and 510 of the gas flow velocity measurement method flow chart of FIG. 11, once all transceiver/transducers in planes $Z_I$ and $Z_{II}$ have fired and the transmitted acoustic signals have been received by the opposing plane of transversely aligned transceivers/transducers, the process preferably repeats continually in real time while a 3-D velocity map U is constructed from the spatially distributed line-of-sight acoustic paths, using known 3-D tomographic mapping techniques, such as those utilized in medical or industrial computed tomography systems. The velocity information is extracted and mapped, as shown in FIG. 8. Similarly, a 3-D temperature map T can be constructed utilizing the time of flight data, as will be described in greater detail herein.

After all of the transceiver/transducers 32, 34 in a planar array have fired acoustic signals the respective line-of-sight flow path time-of-flight data are used to derive absolute velocity in the gas flow path in step 560, once corrected for the thermodynamic effects of temperature, gas constant and the speed of sound, as described in greater detail below. Flow velocity measurement accuracy potentially decreases as flow velocity approaches the speed of sound, assuming constant gas temperature in the velocity measurements. Flow velocity below a Mach number of approximately 0.5 is not believed to impact velocity measurement significantly. Therefore it is preferable, but not required, that measured flow velocities should be smaller than half of the local speed of sound that is measured. This method can accurately measure high temperature gas flows, including turbine engine gas flows, despite relatively high absolute velocities, because the local speed of sound increases with temperature.

Figure 6:
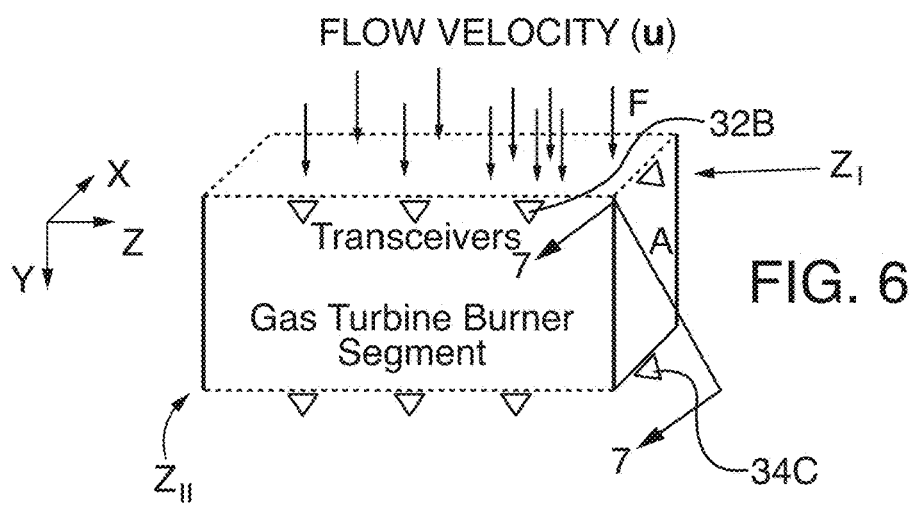
FIG. 6 is an exemplary schematic representation of gas flow velocity in the turbine combustor of FIG. 5 in the line-of-sight between acoustic sensors 32B and 34C.
Figure 7:
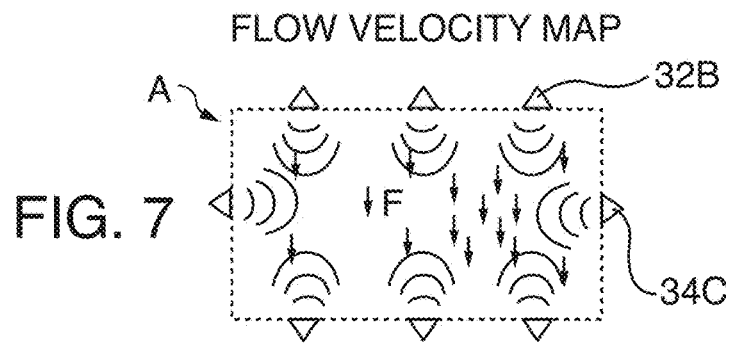
FIG. 7. is a cross-sectional slice A of the gas flow velocity of FIG. 6 taken along 7-7 thereof, which corresponds to the line-of-sight between acoustic sensors 32B and 34C.

Once acoustic time-of-flight data are available, they are used by the monitoring and control system 29 or other remote monitoring system to determine velocity along their respective acoustic paths in accordance with the remainder of the steps of FIG. 11. Referring to FIGS. 6 and 7, information sound propagation is linearly affected by the gas flow. Relative gas flow velocity for a given temperature, gas constant and speed of sound is determined by the known equation:

$$t_{BC} = \int_B^C \frac{1}{c(x,y,z) + \vec{p}_{BC} \cdot \vec{u}(x,y,z)} ds$$

Where:
$t_{BC}$ is the time-of-flight from the first transmitter B to the first sensor C;
c is the speed of sound in the gas flow for the temperature and gas constant;
$\vec{p}_{BC}$ is the unit vector along the first line of sound path A between B and C; and
$\vec{u}(x,y,z)$ is velocity vector in the gas flow.

The exemplary planar slice along the line-of-sound path A shows a simplified flow pattern. Referring again to the flow chart of FIG. 11, the relative gas flow velocity is corrected for thermodynamic temperature, gas flow and speed of sound influences, in order to derive absolute velocity in step 560. If the path temperature is available (step 520) its influence on the speed of sound can be corrected by known tomography methods, in order to derive the gas flow absolute velocity along the line-of-sound path. If the path temperature is not available, times-of-flight for forward (steps 500, 510) and reverse (steps 530, 540) acoustic signal transmission are acquired and used to extract the speed of sound without effect of the gas velocity in accordance with the following equations. The reverse time-of-flight from transducer/transceiver C to transducer/transceiver B is determined by the following equation, similar to that for the forward or downstream direction set forth above:

$$t_{CB} = \int_C^B \frac{1}{c(x,y,z) + \vec{p}_{BC} \cdot \vec{u}(x,y,z)} ds$$

The forward and reverse times-of-flight are added in accordance with the following equation:

$$t_{BC} + t_{CB} = \int_B^C \frac{2 \cdot c(x,y,z)}{c(x,y,z)^2 - \vec{p}_{BC} \cdot \vec{u}(x,y,z)^2} ds$$

Given that the square of the speed of sound c is much greater than the square of the gas flow velocity u, the equation is reduced to:

$$t_{BC} + t_{CB} \approx \int_B^C \frac{2}{c(x,y,z)} ds$$

where:

$t_{BC}$ is the time of flight from the first transceiver/transducer B to the second transceiver/transducer C;

$t_{CB}$ is the time of flight from the second transceiver/transducer C to the first transceiver/transducer B;

c is the speed of sound in the gas flow for the temperature and gas constant;

$\vec{p}_{BC}$ is the unit vector along the first line of sound path; and $\vec{u}(x,y,z)$ is the velocity vector in the gas flow.

The speed of sound c determined in step 550 of FIG. 11 is then used to correct the downstream time-of-flight data for that speed of sound in step 560. The corrected downstream time-of-flight data are used to determine gas flow absolute velocity in step 570. Where the path temperature T along a line-of-flight is not known, the same speed of sound c determined in step 550 is utilized in some embodiments of the invention to determine T, using the previously described isentropic speed of sound relationship $c(x,y,z)=(\gamma \cdot R \cdot T)^{1/2}$, as γ, R and c(x,y,z) are now known. In a similar manner to the path velocity determinations previously described, once all the path temperatures T are known from each receiver/transmitter unit back and forth, there will be 64 (assuming exemplary 8-sensor case) iso-temperature lines in 3-dimensions. Then using known 3-D tomographic mapping techniques, the 3-dimensional temperature distribution is mapped.

Advantageously the active acoustic temperature and velocity measurements are performed simultaneously in real time, thus mapping both gas flow temperature (3-D or alternatively the 2-D mapping of FIG. 9) and 3-D gas flow velocity (FIG. 8). An exemplary acoustic signal transmission and reception timing sequence to perform simultaneous velocity and temperature measurement is to emit an acoustic signal with a transceiver/transducer on a first array plane (e.g., 32A at $Z_I$). The corresponding transversely oriented transceivers/transducers on an axially spaced opposed second plane (e.g., 34B-H at $Z_{II}$) receive the signal for velocity processing and/or temperature processing, if 3-D temperature measurement is utilized. If only 2-D temperature measurement is utilized the remainders of the transceiver/transducers on the first array plane (e.g., 32B-H at $Z_{II}$) receive the signal for temperature processing. As previously noted the transmission and receiving process also can be accelerated by utilizing unique signal transmission patterns for each transceiver/transducer. There are tradeoffs associated with use of 2-D or 3-D temperature measurement. Where 3-D temperature measurement techniques are utilized, accuracy of both temperature and velocity map may not be the most desired in case of gas velocities of Mach 0.3 or above as the approximation shown in the equation $$t_{BC} + t_{CB} \approx \int_B^C \frac{2}{c(x, y, z)} ds$$

may be less accurate in those velocities ranges, because there are no independently determined temperature reference values. However, independent temperature T reference values may be determined, using a pair of axially separated 2-D acoustic signal sets and two individual acoustic temperature maps determined with the respective 2-D time-of-flight signal sets. The 2-D temperature maps are in turn interpolated to create a volumetric temperature map. This volumetric map will be used to provide the temperature values T utilized in the isentropic speed of sound equation, along with the known gas constant R and specific heat ratio γ to extract speeds of sound c. The speed of sound is then used to extract the velocity vectors u(x,y,z). Once the velocity vectors are extracted the velocity components can be mapped, eliminating the limitation of below Mach 0.3 gas velocities inherent in the previously descried 3-D velocity and temperature mapping methods.

Combustor active gas flow velocity or velocity/temperature monitoring utilizing the system and method embodiments described herein with arrays of commonly utilized acoustic sensors is believed to provide faster velocity and temperature change response than known velocity and temperature monitoring systems. In accordance with embodiments of the invention one array of commonly utilized, reliable acoustic transceiver/transducer sensor-transmitters or arrays of separate discrete acoustic sensors and transmitter pairs can be placed in a combustion flow path under field conditions and monitored to provide active, real time simultaneous velocity and temperature data and anomaly detection that are all useful for monitoring and control of combustion power generation equipment, such as industrial gas turbines.

Mapping Parameter Distributions

A parameter map in a two-dimensional or three-dimensional space has numerous uses in the design, diagnosis and control of machinery. For example, a temperature or velocity map of a region of the gas path is useful in diagnosing and accurately measuring the performance of a gas turbine engine. The map may, for example, be a temperature map in the vicinity of the combustor flame or may be a turbine inlet temperature map in the region exiting the combustor. Simple temperature maps are presently created using thermocouple temperature rakes and temperature probes mounted on the first row vane to obtain measurements from which a crude linear temperature profile may be fit. Those short-term, intrusive methodologies provide crude profiles based on sensor locations but do not provide a spatially resolved map of temperatures in real time that one could utilize to control a gas turbine or to understand temperature distribution during a new engine design validation process.

Figure 12:
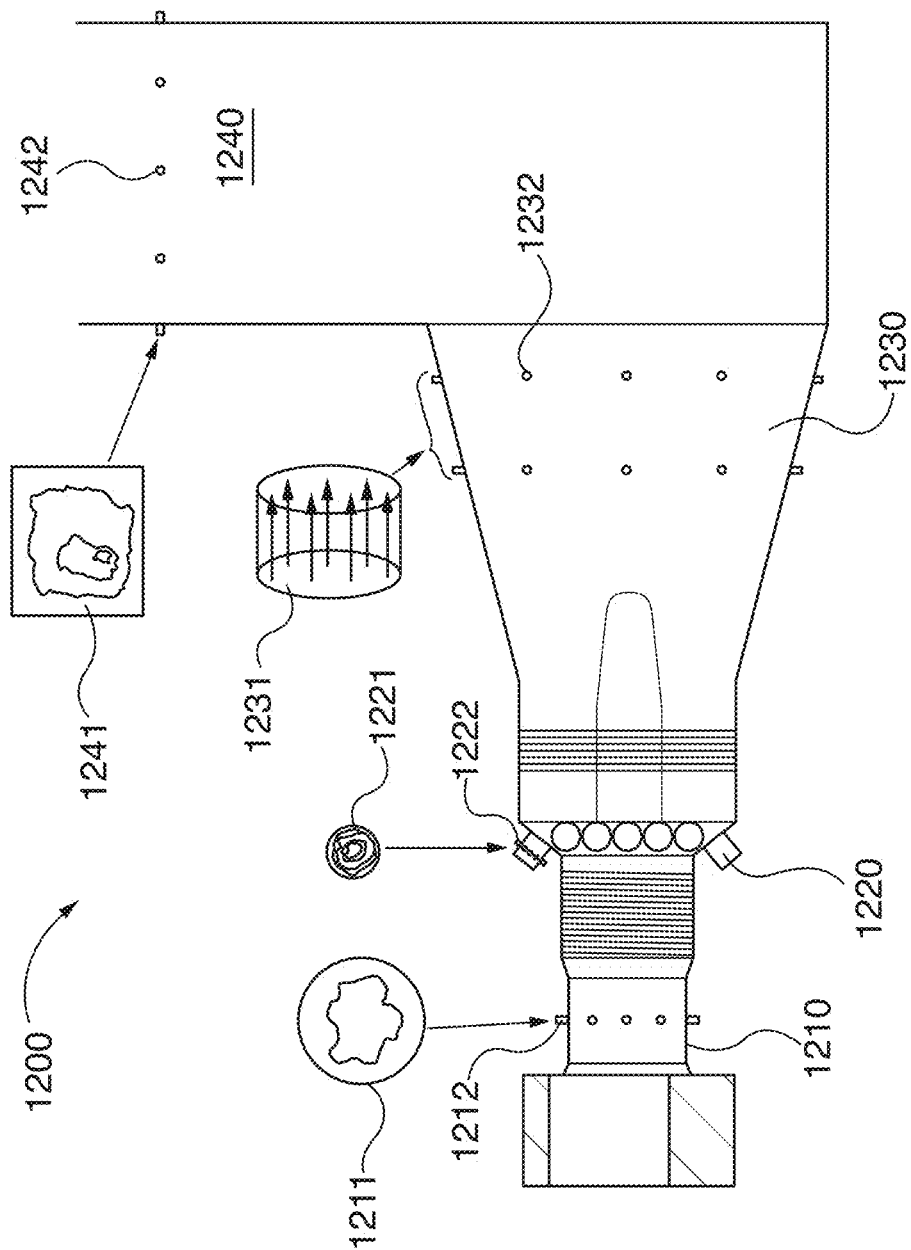
FIG. 12 is a schematic illustration of a gas turbine engine showing sensor installations in several alternative regions, in accordance with embodiments of the invention.

Presently described are techniques for using acoustic or other signals that are transmitted and received in a region of a gas turbine engine. Many flow regions of a gas turbine engine may be of interest in the use of the presently described techniques, and several exemplary regions are depicted in the schematic diagram of the gas turbine engine 1200 shown in FIG. 12. An inlet temperature map 1211 of a gas turbine inlet 1210 may be created using the described techniques and using acoustic sensors 1212 arranged circumferentially around a planar region of the inlet. A combustor temperature map 1221 may be created to show temperature distributions in regions of the combustors 1220. Depending on the area of interest, the sensors 1222 may be arranged around a plane through a primary combustor flame zone or a turbine inlet (combustor exit). A three-dimensional velocity map 1231 of gas flow through a turbine diffuser 1230 may be constructed using information from sensors 1232 arranged circumferentially around multiple planar regions in the diffuser. An exhaust temperature map 1241 may be created using sensors 1242 to show temperature distribution in a two-dimensional region of the turbine exhaust 1240. One skilled in the art will recognize that the described techniques may be implemented with other sensor arrangements and other gas turbine engine regions to yield additional useful parameter maps.

An advanced methodology of tomographic principles is utilized to extract a spatially resolved map in real time using a few dozen individual paths of the signals. As described above, the sensors may be acoustic sensors and speed of sound information on each path is processed to estimate the average temperature over that path length. At each time interval, representations of each of the paths containing average temperature information are tomographically mapped into the spatial distribution of the temperatures at the measurement time and then updated for subsequent measurement times. Information from the resulting temperature map may be used in the engine control algorithm or to maintain safety of engine operation and low emission levels.

Figure 13:
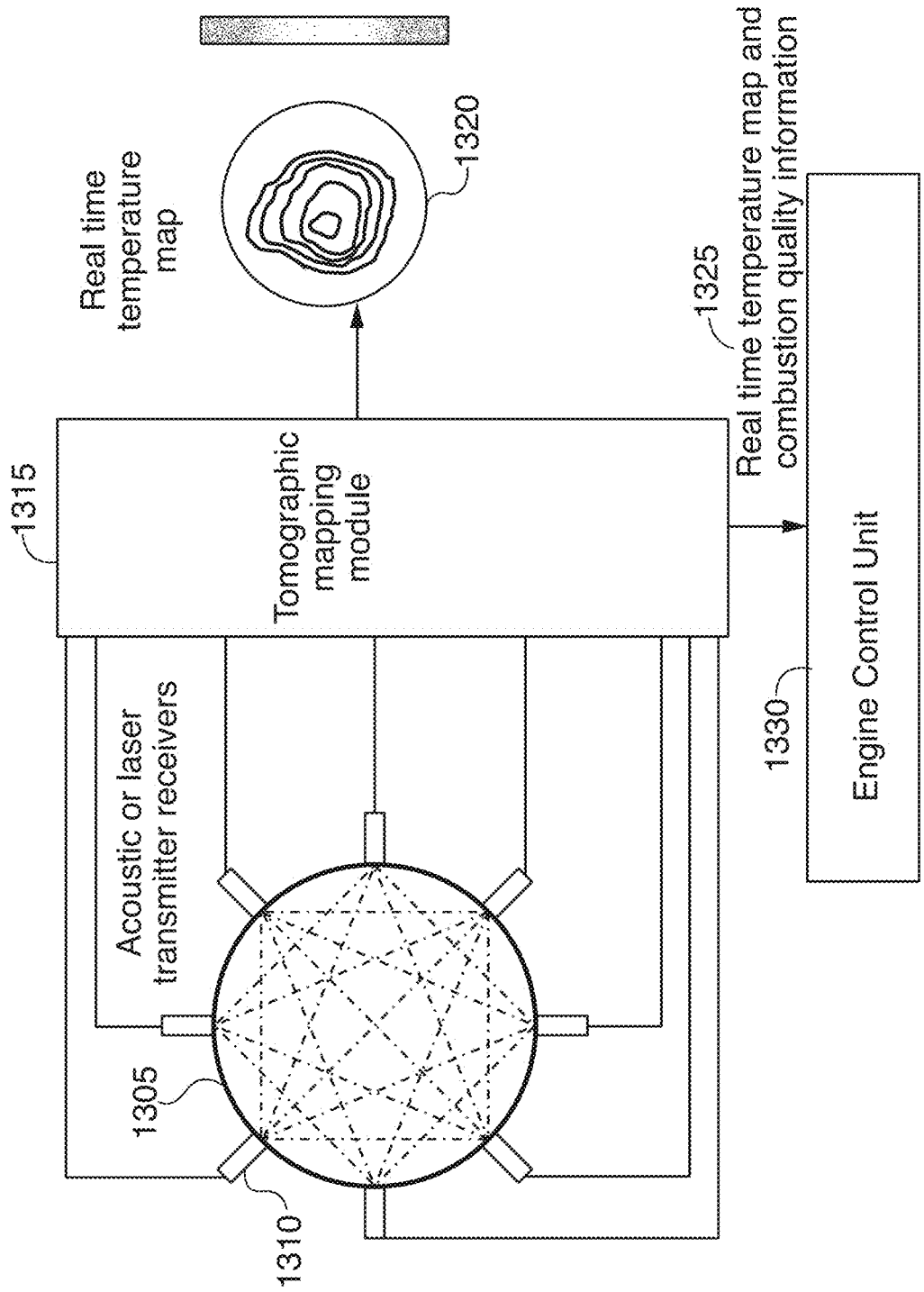
FIG. 13 is a schematic illustration of a system for mapping flow parameters in a gas turbine engine region, in accordance with embodiments of the invention.

In embodiments as discussed above and as shown in FIG. 13, the transmitters and sensors 1310 are circumferentially distributed around a cross section of the hot gas path of one or more turbine regions 1305. The sensors and receivers may, in some embodiments, be acoustic transceivers (sender/receiver combinations) arranged in a plane through the combustor where those transceivers will send and capture acoustic signals in real-time. While the disclosure discusses the sensors and receivers with reference to acoustic sensing techniques, one skilled in the art will understand that the sensors and receivers may alternatively utilize laser-based tunable diode laser absorption spectroscopy or another measurement technology to determine an average temperature along a line path in the combustor. In the case of acoustic transceivers, the transmitted signals are used to determine an average speed of sound, which is used to estimate an average temperature.

In the case of laser based tunable diode laser absorption spectroscopy, several techniques for temperature measurement are possible. Path averaged temperatures may be measured by probing two different absorption lines for the same species while sweeping the laser across the absorption spectrum. Laser absorption by gases across the plane in certain infrared wavelength bands is proportionate to species concentration and temperature and can be solved to provide averaged path temperatures along each line. Alternatively, the Full Width at Half Maximum (FWHM) of the probed absorption line may be related to the Doppler line width of the species. Other laser-based or other temperature measurement techniques may be used without departing from the scope of the disclosure.

In the case of temperature mapping, a tomographic mapping module 1315 converts a plurality of average path temperatures into a temperature map 1320 at each time interval that the temperatures are sampled. The two-dimensional or three dimensional map includes high spatial resolution isotherms and provides more valuable information than separate average path temperature estimates for interpretation of the engine health as well as for inputs to the engine control algorithm. The temperature map 1320, together with derived combustion quality information 1325, is transmitted to an engine control unit 1330 that utilizes that information to control the combustors and/or the gas turbine engine.

While described with reference to the construction of a temperature map from average path temperature estimates, the techniques described herein may be used to construct other two dimensional or three dimensional maps from average values of paths. For example, the estimated average velocities along transmitter receiver paths may be used to construct a two-dimensional or three dimensional map of local velocities using the similar methods.

Described herein are several different techniques for mapping and extracting spatial information about a parameter from a set of path averaged lines in a region. Those techniques include a polynomial approximation method, a basis function method and a grid optimization method. Each of those techniques is described in turn below. While several of the descriptions refer to an exemplary embodiment in which a gas flow temperature is measured, one skilled in the art will recognize that the described techniques are applicable to mapping other parameters where average values along linear paths are available.

Figure 14A:
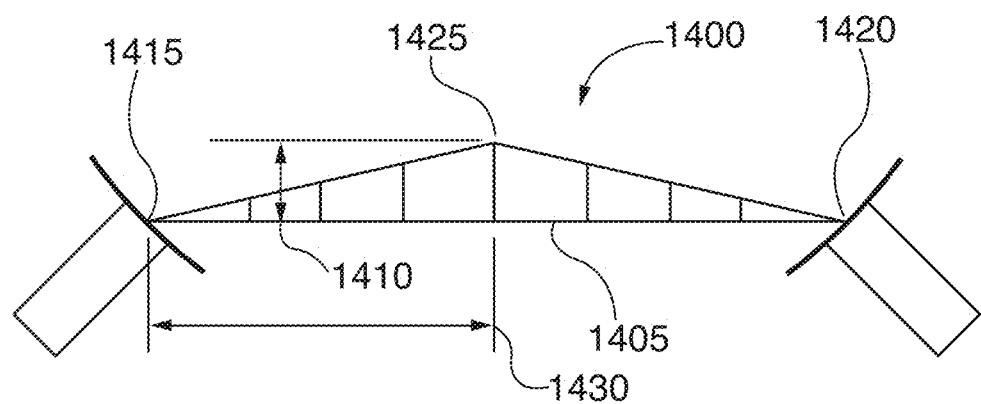
FIG. 14A is a schematic depiction of a bilinear representation of a parameter along a path, in accordance with embodiments of the invention.
Figure 15:
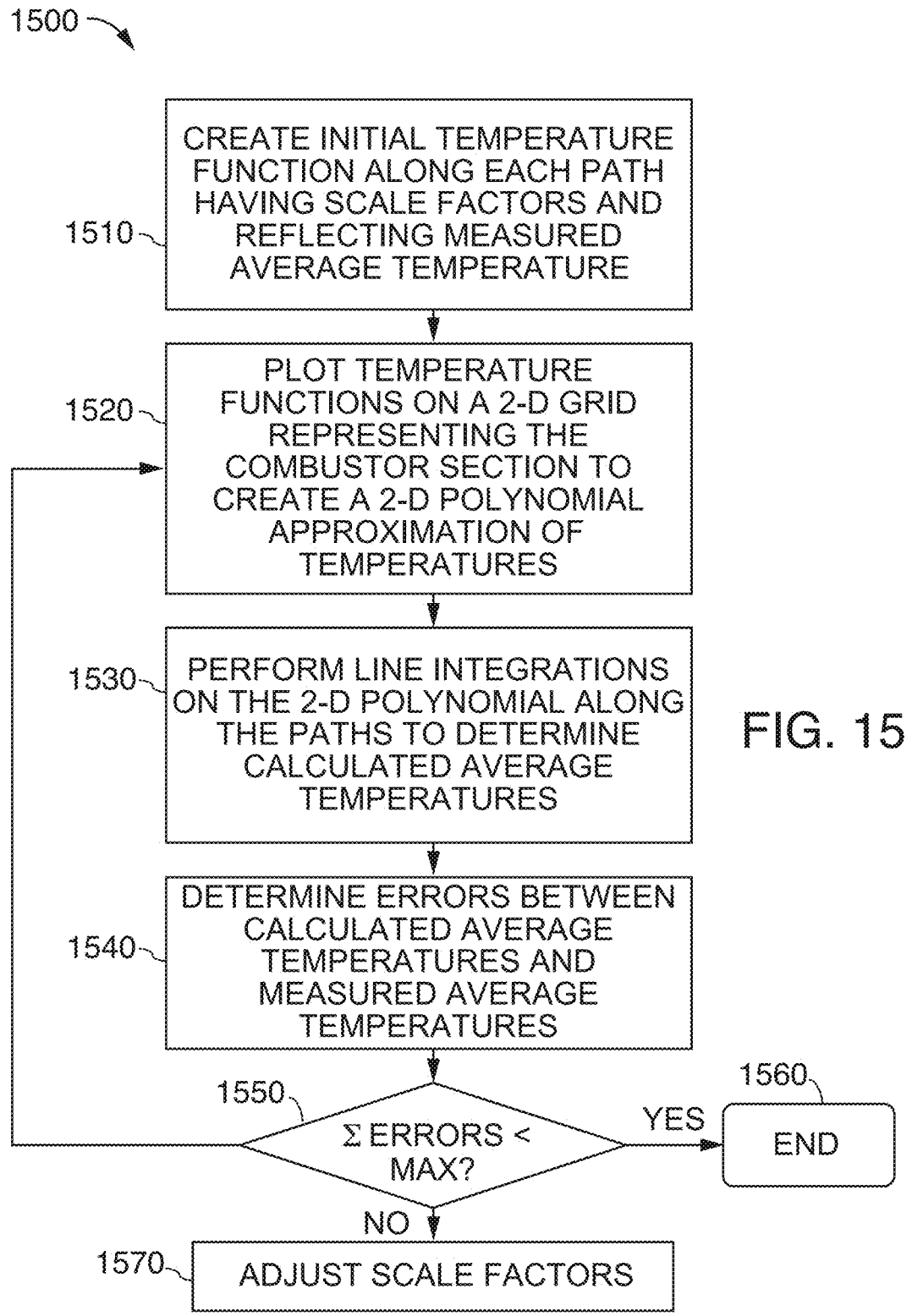
FIG. 15 is a flow chart showing a technique for mapping a parameter based on average path values, according to embodiments of the invention.

Polynomial Approximation Technique:

One way of accomplishing the task of converting a plurality of average path temperatures to a temperature map is to approximate the temperature profiles along each path with a polynomial and then, through an iterative process as shown in the flow chart 1500 of FIG. 15, to adjust the parameters of each polynomial to minimize errors. To do this, each path, such as path 1405 shown in FIG. 14A, is initially assigned, in operation 1510 (FIG. 15), a temperature function that includes scale factors and reflects the estimated average temperature along the path. In the bi-linear profile 1400, temperatures increase linearly from the end points 1415, 1420 (i.e., the transmit and receive points at the chamber walls) to form a peak 1425 yielding a profile similar to the cross section of a tent. The initial maximum temperature is at the peak and the minimum (wall) temperatures are at either end. The distance 1430 from the transmit end point 1415 to the peak 1425 is determined by a midpoint scale parameter. The midpoint scale parameter may be initially set to 50% of the path length by default.

The peak height 1410 defines the initial maximum temperature along the path 1405 at the peak 1425. Initially, a peak height scale factor may be set to the value of two times the average path temperature.

The end points 1415, 1420 may be assumed to be constant and are held at a constant level by the algorithm relative to a wall temperature variable. The wall temperature variable may be selected in several ways. In one example, a fixed value is manually entered. In another example, a percentage of the average path temperature, or the minimum path temperature, is used. In other embodiments, an actual sensor such as a high temperature thermocouple is used to input a wall temperature signal directly into the algorithm.

Bilinear integration is performed from the transmit point 1415 (wall temperature) to the mid-point 1425 (measured path temperature iteratively computed scale factor) and back down to the receive point 1420 (wall temperature).

Figure 14B:
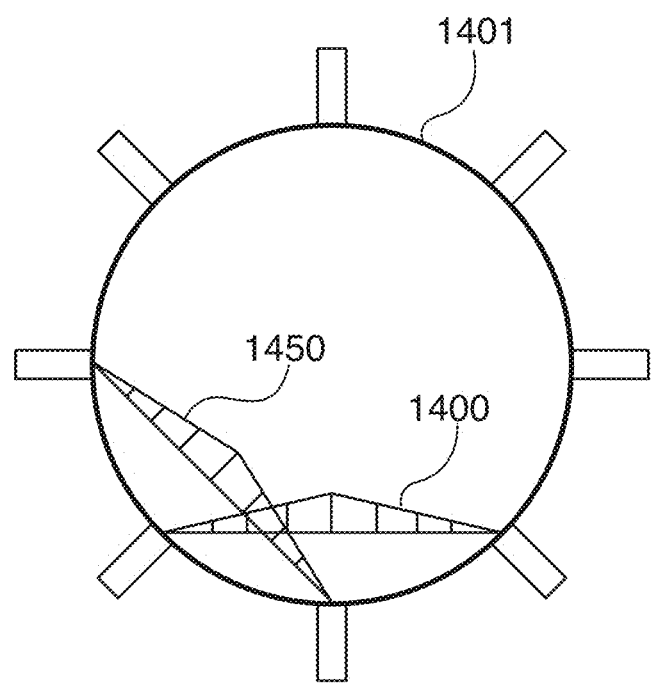
FIG. 14B is a schematic representation of a two-dimensional space with two bilinear representations of path profiles, in accordance with embodiments of the invention.

The estimated path profile 1400 is then plotted, in operation 1520, into a two dimensional grid representing the planar area of the chamber 1401, as shown in FIG. 14B. That process is repeated for each path, such as exemplary second path 1450. When all temperatures have been plotted onto the grid, the grid contains a sparse representation of the temperature map. As a result, there are missing points on the grid in the open areas between paths. In those open areas, a curve smoothing technique such as a Bezier function is used to transform the set of known points into a polynomial approximation of the actual temperature curve at discrete points on the grid. After the grid is smoothed, line integrations are performed along line paths, in operation 1530, and compared to measured data in operation 1540. The result of that comparison is used to adjust the scale factors in block 1570 for the next iteration to minimize the error between measured and estimated temperatures. The iterative process may be repeated according to decision operation 1550 between 3 and 20 times to produce a surface with the least error when compared to the original measured average path temperatures.

The iterations are ended in operation 1560 when the errors are below a preset maximum. While there is no specification for absolute error or accuracy of the generated isothermal map, an average path error value can be calculated to provide a confidence factor for any given map. The average path error will range from 0 to 3-4% for a typical system in normal operation. If the mapping plane and the physical factors have been optimally selected, this can be used for a very accurate spatial map from the path averaged temperature information.

Figure 17:
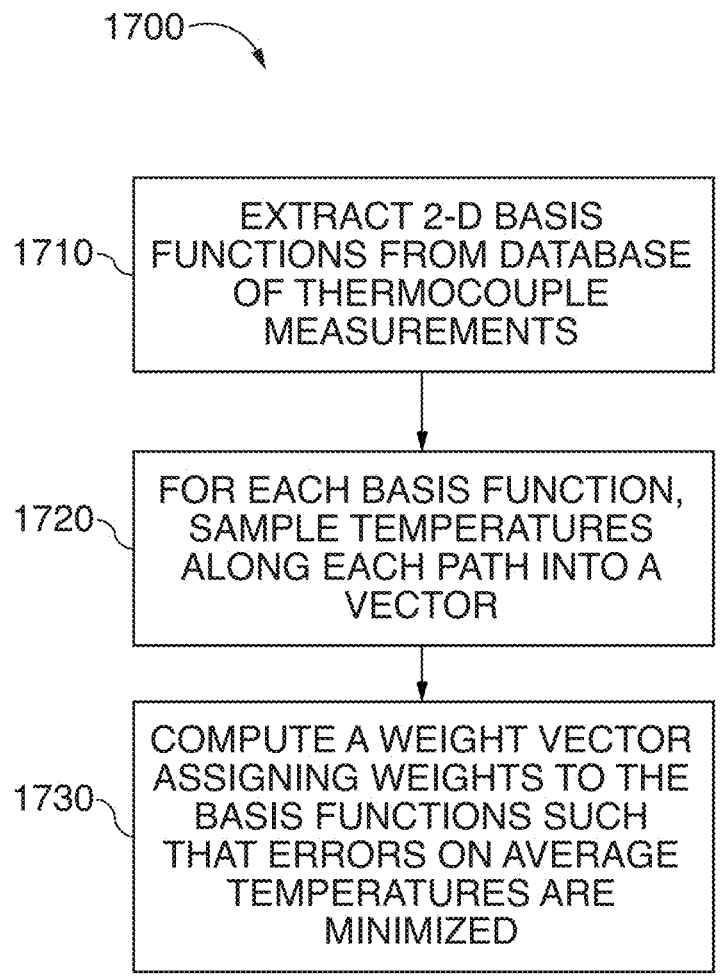
FIG. 17 is a flow chart showing a technique for mapping a parameter based on average path values, according to embodiments of the invention.

Basis Function Technique:

Another technique for converting a plurality of average path temperatures to a two dimensional temperature map is the use of basis functions. In general, every continuous function in a function space may be represented by a linear combination of basis functions. In the presently described technique, portrayed in the flow chart 1700 of FIG. 17, the temperature map is represented by a linear combination of 2-dimensional basis functions derived from thermocouple measurements.

The 2-dimensional basis functions are extracted, as shown in operation 1710, from a large database of thermocouple temperature measurements or other parameter measurements, using a statistical procedure such as principal component analysis (PCA). The boundary conditions are fixed/constant for the 2-dimensional basis functions based on a manually entered fixed value, or on measured wall temperatures. The technique finds weights for the basis functions that minimize error on measured times of flight. In embodiments, the weights are found iteratively.

Figure 16:
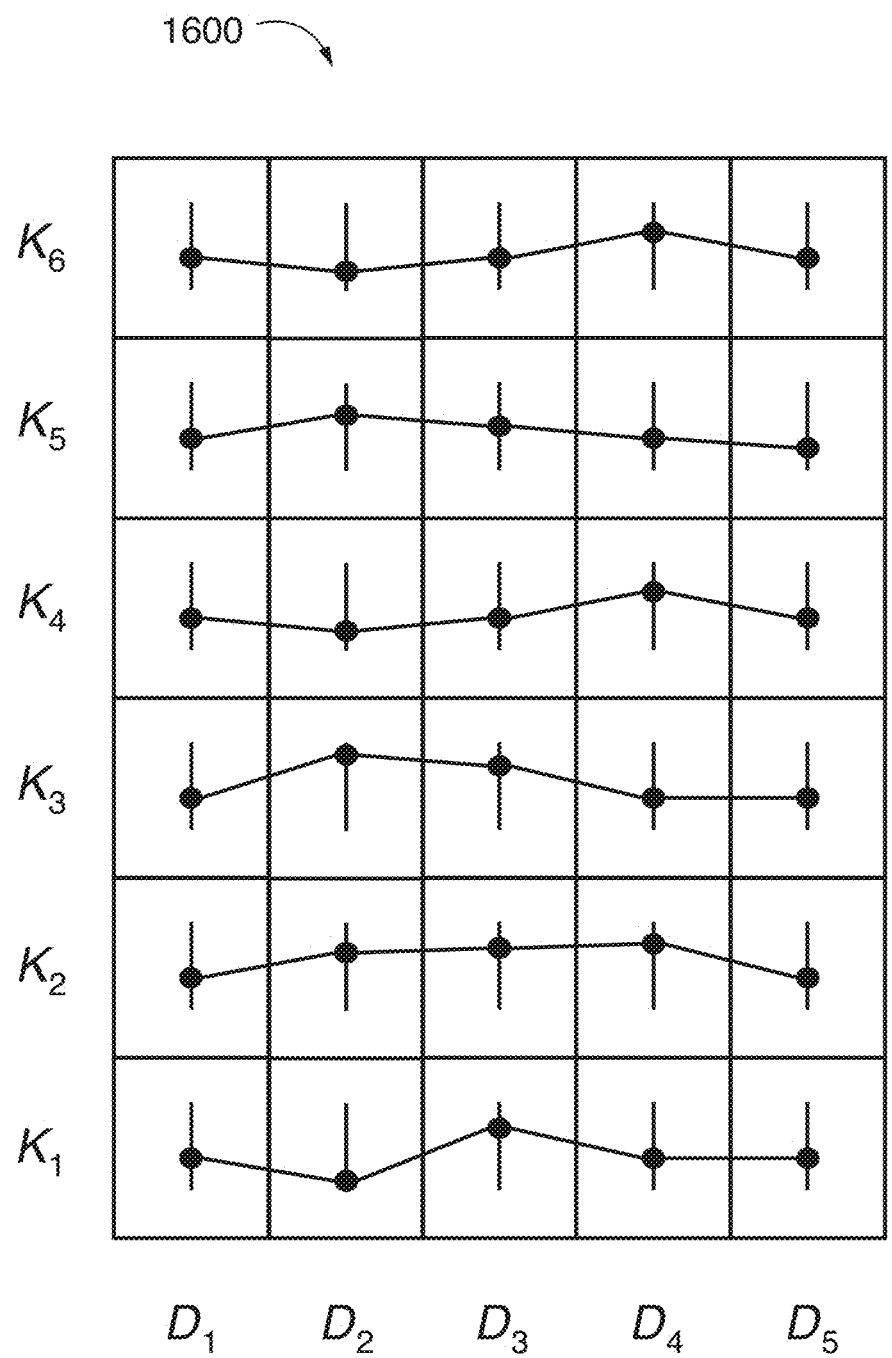
FIG. 16 is a diagram showing parameter profiles for a single path, according to embodiments of the invention.

In one embodiment, there are K two-dimensional basis functions derived from the thermocouple measurements. There are furthermore I acoustic paths i and $t_i$ mean temperatures, one estimated from each time of flight measurement along an acoustic path. For each basis function and path, the path temperatures are sampled (operation 1720) into a vector along a length D of the path. For each path i, the sampled temperatures are collected in a D×K matrix $X_i$, as illustrated by the matrix 1600 of FIG. 16, which shows, for a single path, six temperature profiles for six basis functions $K_1$-$K_6$, each sampled at five locations $D_1$-$D_5$. For example, for the basis function $K_1$ shown in matrix 1600, five temperature samples are illustrated for five sampled points D1 through D5 along the path. Similar matrices are created for each of the other paths. The goal is to find (operation 1730) the combination of basis functions that best represents the mean temperatures measured by the times of flight. The weighted combination of basis functions is given by the weight vector a which can be found as:

$$\operatorname*{argmin}_{a} \sum_{i=1}^{I} \left\| \frac{1}{D} a^T X_i \mathbf{1} - t_i \right\|^2.$$

Figure 18:
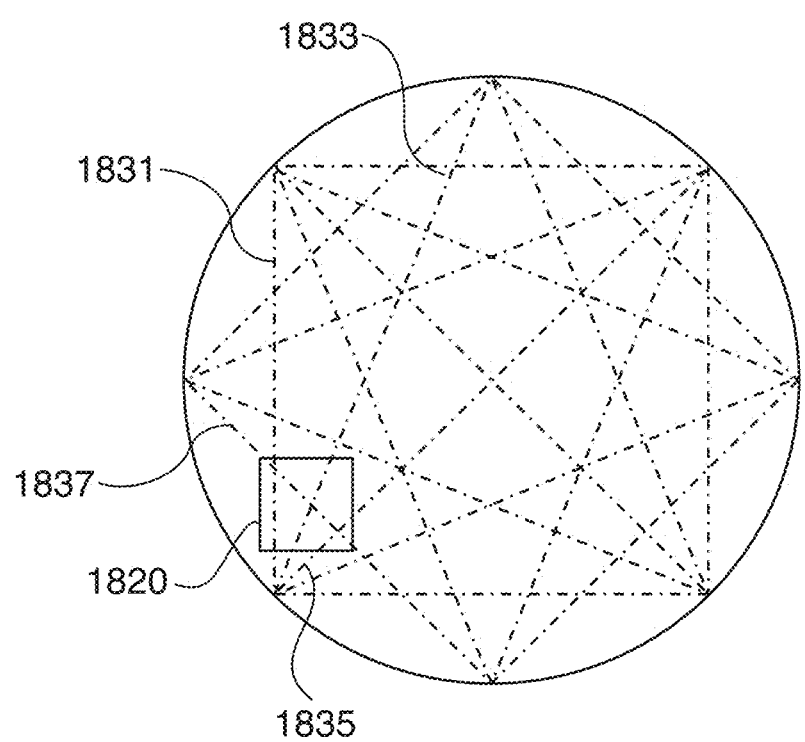
FIG. 18 is a schematic view of a two dimensional space showing measurement paths and a grid segment, according to embodiments of the invention.
Figure 19:
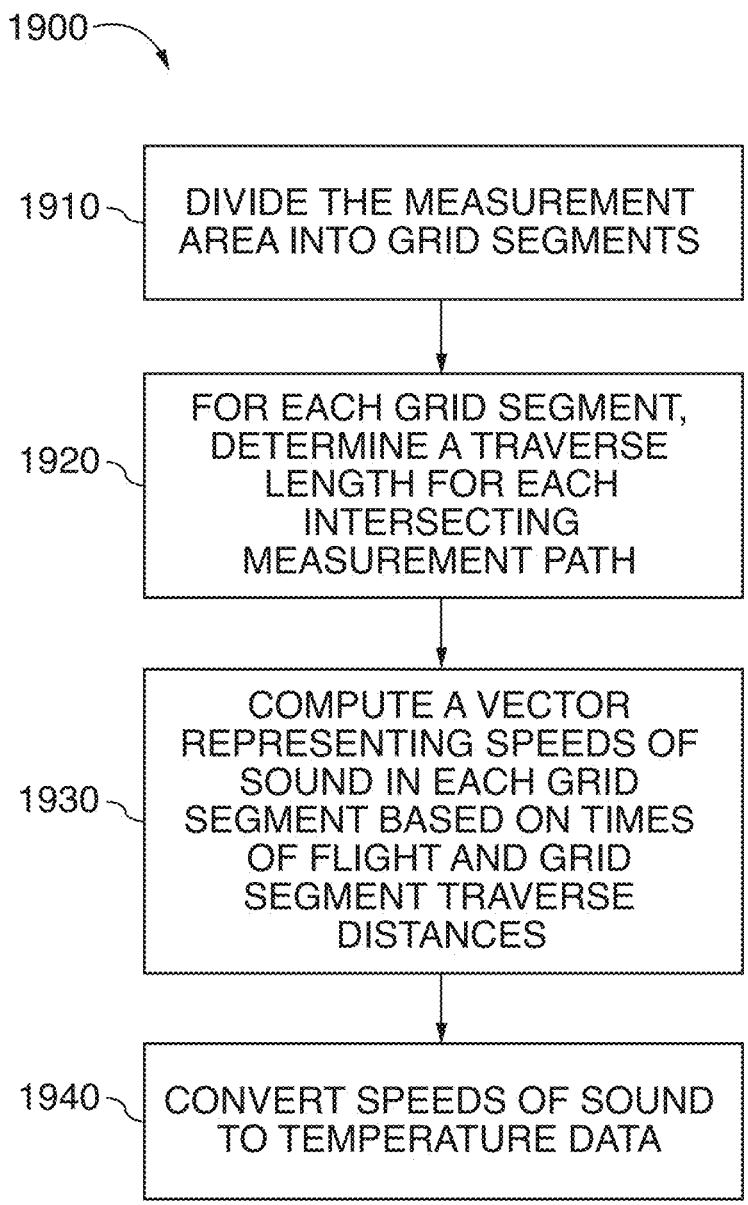
FIG. 19 is a flow chart showing a technique for mapping a parameter based on average path values, according to embodiments of the invention.

Grid Optimization Technique:

In an embodiment utilizing acoustic signals, the estimated average path temperatures may be converted to a two dimensional temperature map using a grid optimization technique shown in the flow chart 1900 of FIG. 19, in which the 2-dimensional map is segmented into multiple grid segments (operation 1910), such as the grid segment 1820 shown in FIG. 18. The goal is to estimate the value (temperature or velocity) in each grid segment. A grid segment is defined as a region bounded by the horizontal and vertical lines of the grid. The speed of the acoustic signal throughout each grid segment is assumed to be uniform.

The distance covered by each acoustic path in traversing each grid segment is initially calculated, at operation 1920. In the example shown in FIG. 18, the distances within the grid segment that are traversed by paths 1831, 1833, 1835 and 1837 are determined. Since the total time of flight for each path and the distance traversed by the path through each grid segment is known, the time taken to travel through each grid segment along a path can be calculated by solving following system of equations;

$$\begin{bmatrix} t_1 \\ t_2 \\ \ldots \\ t_n \end{bmatrix} = \begin{bmatrix} d_{11} & d_{12} & \ldots & d_{1m} \\ d_{21} & d_{22} & \ldots & d_{2m} \\ \ldots & \ldots & \ldots & \ldots \\ d_{n1} & d_{n2} & \ldots & d_{nm} \end{bmatrix} \begin{bmatrix} x_1 \\ x_2 \\ \ldots \\ x_m \end{bmatrix}$$

where n is an index of paths, m is an index of grid segments, t is the time of flight for a given path, x is a coefficient of each grid segment corresponding to a reciprocal of the speed of sound in that grid segment $$\left( \frac{1}{\text{velocity}} \right)$$

and d is the distance traversed by a path n through each grid segment m.

A boundary condition is applied on the grid segment coefficients corresponding to the boundary $$x_w = c$$

where w is a grid segment index corresponding to the wall and c is a constant derived from the wall temperature.

To reduce the search space and limit the solved result to within acceptable ranges, upper and lower bounds for the coefficients are imposed based on the physical reality. For example, the temperature of each grid segment may be restricted to a value greater than room temperature and less than 1000° C.

The number of grids segments to be solved may greatly exceed the number of path equations, making a large number of solutions possible. In that case, additional optimization criteria such as minimizing the difference between speeds of sound in neighboring grid segments are imposed to obtain a smooth map which is also close to reality.

After computing a value for a speed of sound for each grid segment (operation 1930), temperature values are estimated for the grid segments, and a temperature map may be constructed (operation 1940) using those values.

In embodiments, the above techniques may be employed in controlling a gas turbine engine using temperature data. Once the two-dimensional temperature map is computed, it is available in real-time for the computation of information useful in controlling the engine. For example, referring to FIG. 13, the tomographic mapping module 1315 may compute the bulk mean temperature (average temperature of the map), the distribution of temperature in the plane (as a goodness function or as a profile), and a difference of temperature between different baskets if the combustion system is a can or can annular combustion system. That information is then provided to the engine control unit 1330, which is intelligently programmed to control engine parameters for optimum engine performance (safety, performance and emissions).

Transceiver/transducers 32A-H and 34A-H (see FIG. 5) transmit and receive acoustic signals that define acoustic paths. Time of flight measurements along corresponding acoustic paths are then used to generate a temperature map such as temperature map 1320 shown in FIG. 13. Each acoustic signal is transmitted and received by transceiver/transducers 32A-H and 34A-H through a waveguide associated with a transceiver/transducer. Although the following description refers to the generation of a temperature map, it is understood that the current invention is applicable to any mapping method that utilizes measured line averages, such as the average temperature on an acoustic path between transceiver/transducers 32A-H and 34A-H. In particular, the current invention is applicable to the mapping of parameters of a hot gas flow path such as gas flow temperature or velocity in flow regions of gas turbine engines, for example.

Figure 20:
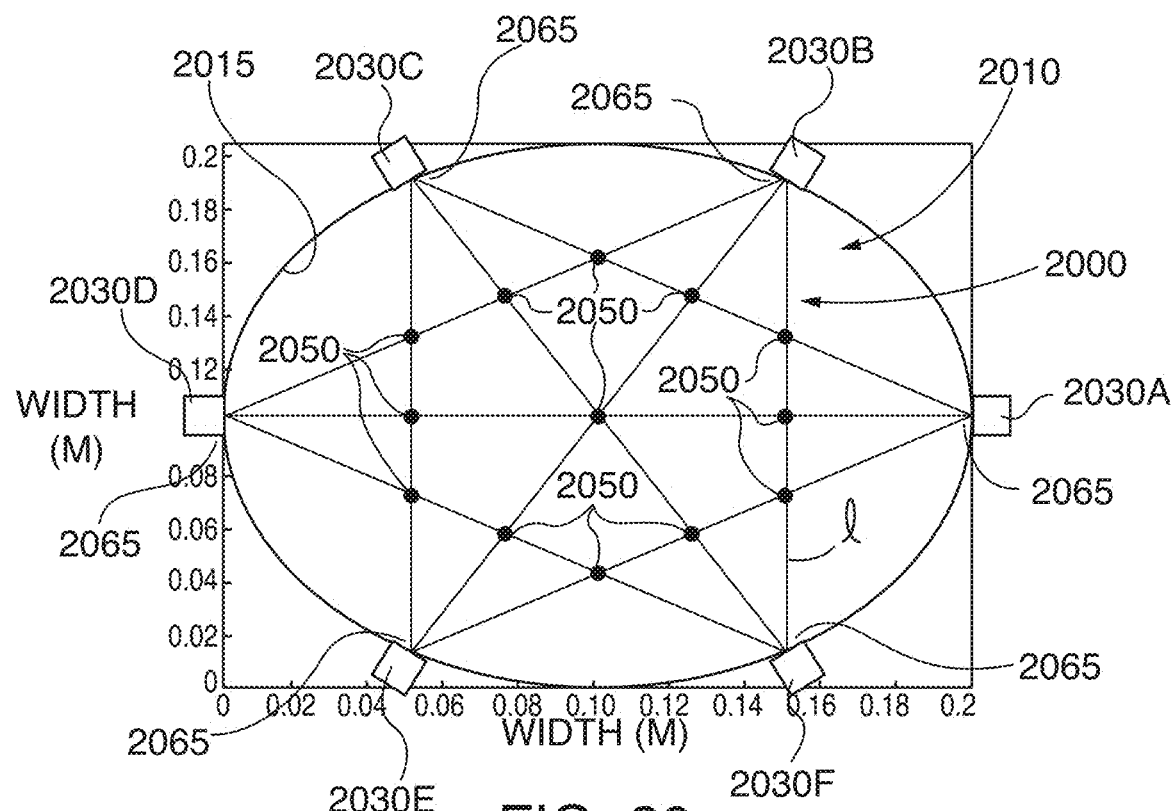
FIG. 20 is an exemplary cross sectional view of a plurality of acoustic paths or lines located in a measurement space of a hot gas flow path.
Figure 21:
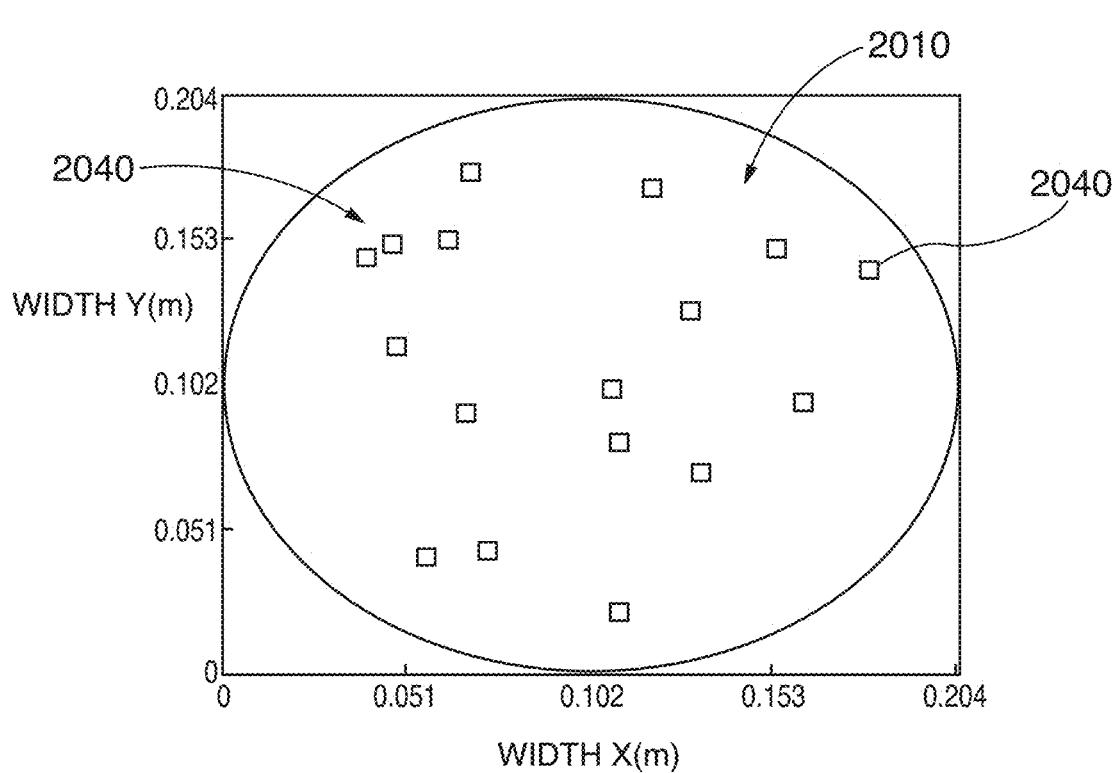
FIG. 21 depicts random base points used for generating a temperature map, wherein the base points are seat points for a basis function.
Figure 22:
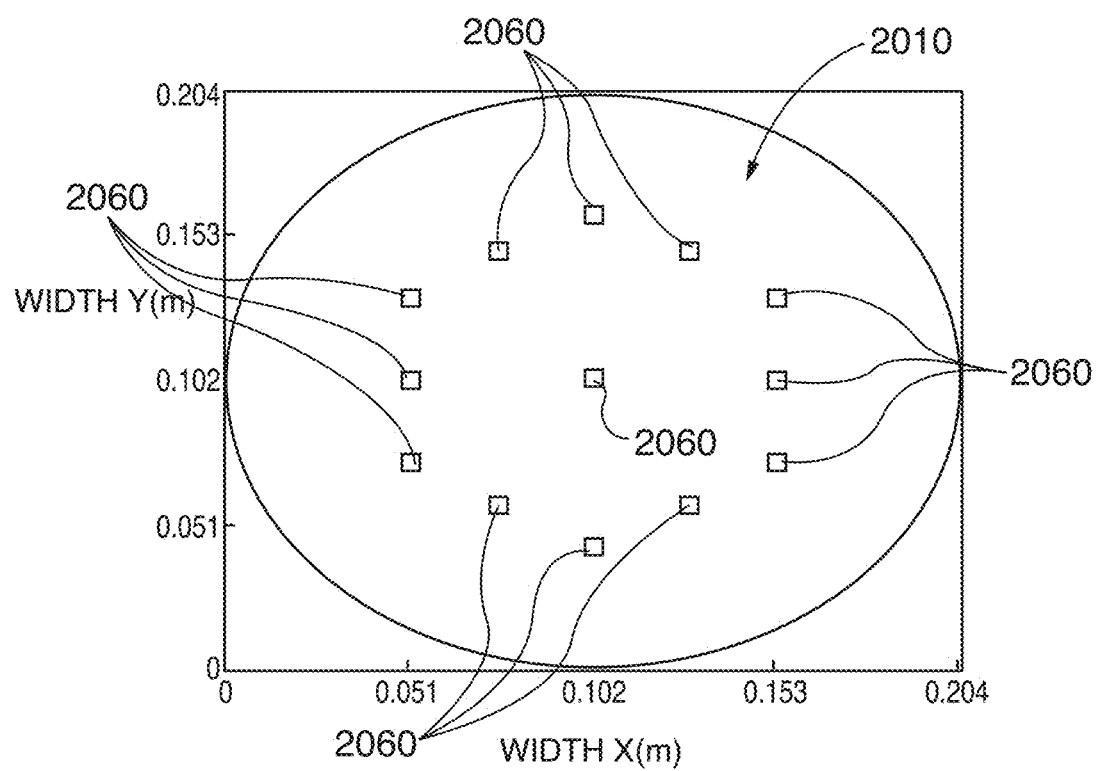
FIG. 22 depicts base points that coincide with acoustic path intersection points in accordance with the invention, wherein the base points are seat points for a basis function.

Referring to FIG. 20, an exemplary cross sectional view is shown of a plurality of acoustic paths or lines 2000 located in a measurement space 2010 for a hot gas flow path. For purposes of illustration, the hot gas flow path is constrained by a wall or boundary 2015 such as in a combustor 20 although it is understood that the hot gas flow path may be located in the turbine diffuser 1230 (see FIG. 12) or an exhaust stack. FIG. 20 depicts a plurality of transceiver/transducers (i.e. transceivers), for example transceivers 2030A-2030F, that generate acoustic signals that form the acoustic paths 2000. Further, the acoustic paths 2000 cross at intersection points 2050 in the measurement space 2010. In FIGS. 20-22, "Width" refers to a diameter of measurement space. As can be seen in the figures, the width in the x and y axes is the same thereby depicting a circular cross section for the measurement space 2010 although it is understood that the measurement space 2010 may have a non-circular shape.

It is desirable to improve spatial resolution of a hot gas flow path parameter map such as a temperature map. A technique for improving spatial resolution of a temperature map is to increase the number of transceivers that are utilized. However, this requires several additional pairs of transceivers which increases system cost from both a hardware and an installation standpoint. Also, increasing the number of transceivers requires expensive data acquisition and processing solutions thus increasing computational costs. In addition, there is limited available space near a desired measurement area of a gas turbine, thus limiting the number of transceivers that may be installed.

As previously described, a temperature map may be generated by utilizing a basis function technique wherein principal component analysis is used to extract two dimensional basis functions from a database of thermocouple temperature measurements. In another embodiment, two dimensional Gaussian basis functions that are centered on base points in the measurement space 2010 may be used to generate a two dimensional temperature map. In particular, the base points act as seat points for the basis functions. Optimization techniques are then used to solve for the weight of the Gaussian functions such that a fitting error relative to measured mean temperatures along the lines is minimized. Referring to FIG. 21, random base points 2040 (depicted as squares in FIG. 21) in the measurement space 2010 may be selected as the seat points in one approach. However, use of random base points 2040 undesirably increases computational time.

In accordance with an embodiment of the invention, base points 2060 (see FIG. 22) are selected that coincide with intersection points 2050 of the acoustic paths generated by the transceivers shown in FIG. 21. Thus, the geometry of the location of the transceivers 2030A-2030F, such as the arrangement of the transceivers about a portion of a gas turbine, defines the location (in two or three dimensional coordinate space) of the base points 2060. The base points 2060 are used as center or seat points for the basis function. In addition, starting and end points of each acoustic path 2000 are also used as seat points. The location of base points 2060 and starting/end (i.e. boundary points 2065) points in turn defines the location and shape of the Gaussian (or modified Gaussian) basis functions. In particular, a seat point that has a relatively close neighboring seat point will have a narrow basis function. Conversely, a seat point that has a relatively farther neighboring seat point will have a broader basis function. The goal is to control the influence of a basis point in a particular location in a temperature map based on a density of the seat points in that map location.

Figure 23:
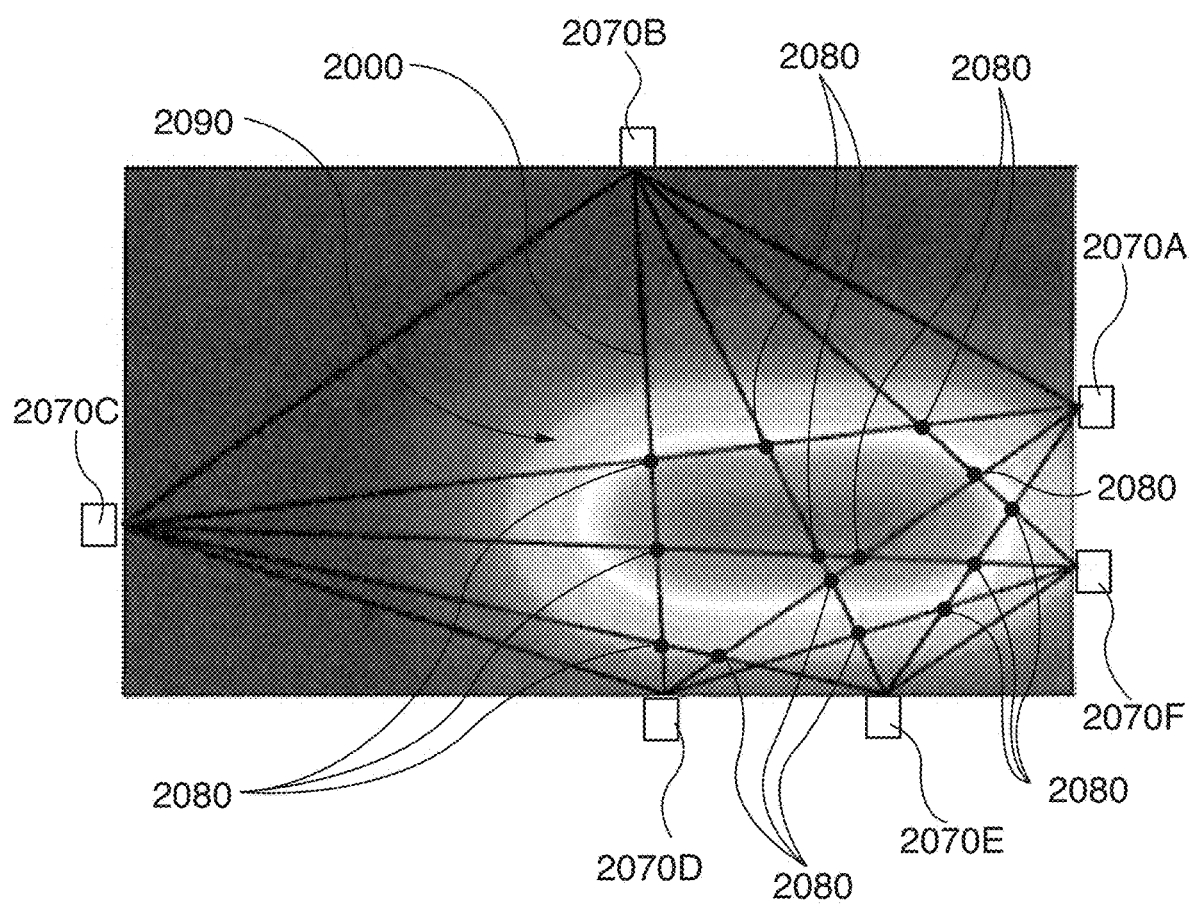
FIG. 23 depicts transducers that are arranged to increase a number of intersections in a desired region of interest for temperature mapping.

Referring to FIG. 23, transducers 2070A-2070F may be arranged so to increase a number of intersections 2080 in a desired region of interest 2090 for temperature mapping. For example, transceivers 2070A-2070F may be arranged about the gas turbine 10 in order to focus and/or optimize the resolution of an area based on prior information. Prior information may include knowledge of the shape of the measurement space 2010 itself (i.e. circular or non-circular shape) or the location of at least one region of interest such as at least one hot section or at least one cold spot or section in the measurement space 2010. The transceivers 2070A-2070F are then arranged about the gas turbine 10 in order to increase the number of intersections 2080 in the region of interest 2090 thereby increasing a density of intersection points and base points in the region of interest 2090 and forming additional base points. In an embodiment, existing the transceivers 2030A-2030F may be rearranged and/or additional transceivers may be used to increase the density of intersection points in the region of interest 2090.

A method will now be described for choosing sparse base points. The method utilizes an optimization technique having an objective and a plurality of constraints. Weight of the basis functions is the value to be solved and is dependent on the average temperatures of the acoustic paths 2000. For example, if the center of a hot gas flow path is the hottest point, then the weight of basis function corresponding to the seat point located in the center of the hot gas flow path has a large weight. The objective is to maximally fit the base points weight to the line average temperatures. In an embodiment, a constraint is that upper and lower bounds based on a physical characteristic of the hot gas flow path may be used for weighting the basis functions. For example, the maximum and minimum temperatures generated in the hot gas flow path may be used as constraints. Another constraint may be to minimize the differences in the weighting of basis functions of relatively close seat points so as to enable smooth mapping. Alternatively, this can also be added to the objective itself wherein the objective is to minimize differences in the weighting of basis functions of relatively close seat points.

Figure 24:
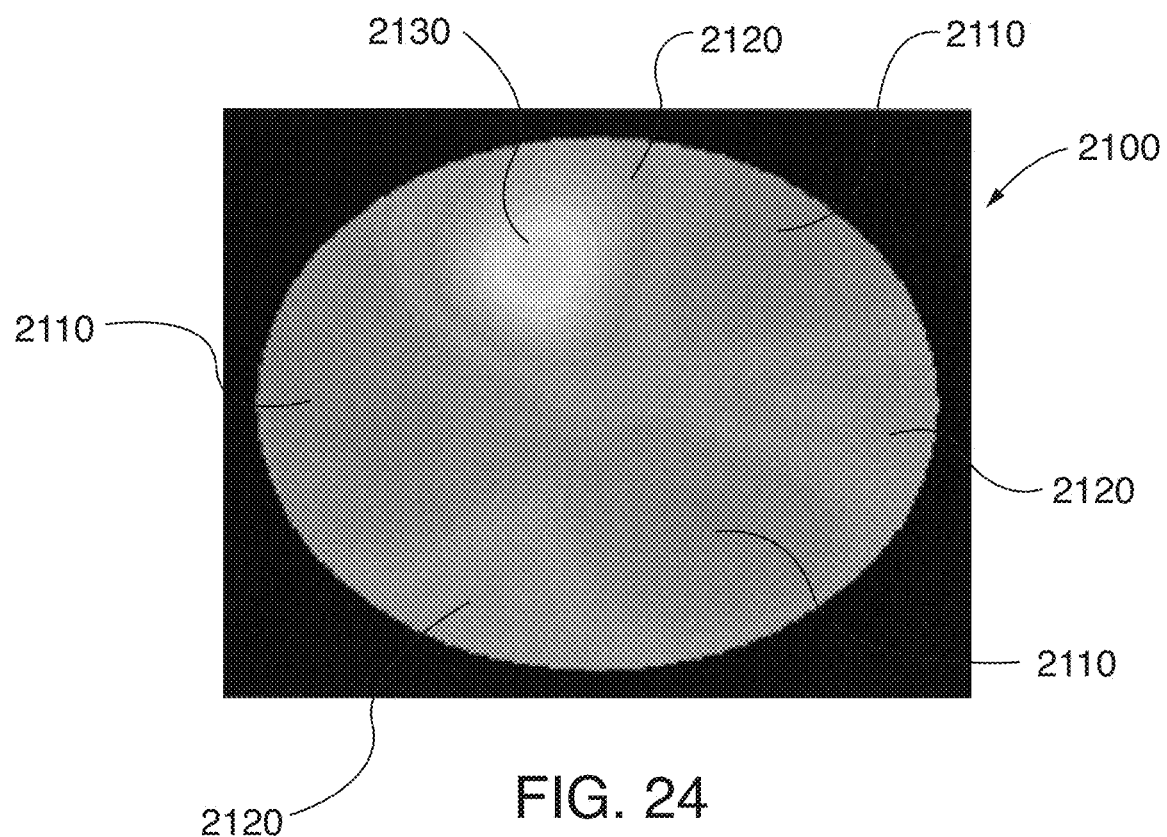
FIG. 24 is a view of an exemplary temperature map wherein the map is generated without a constraint that minimizes differences in weighting functions.
Figure 25:
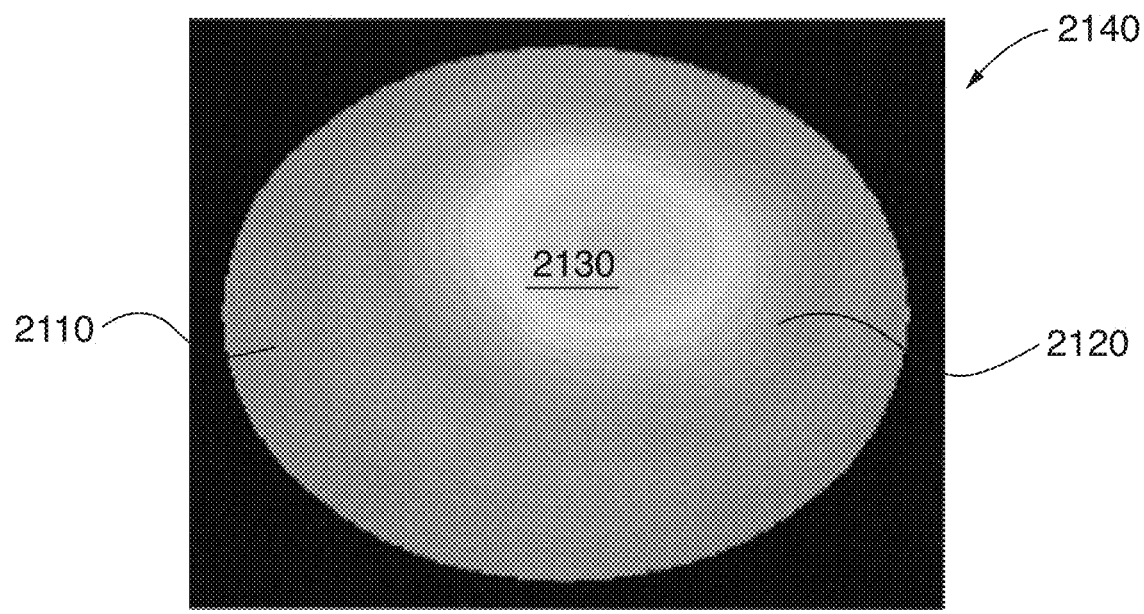
FIG. 25 is a view of an exemplary temperature map wherein the constraint for minimizing differences in weighting functions is utilized.

Referring to FIG. 24, an exemplary temperature map 2100 is shown wherein the map 2100 is generated without a constraint that minimizes differences in weighting functions. In particular, the map 2100 depicts temperature regions 2110, 2120 and 2130 that are separate from each other thus depicting substantial changes in temperature in the map 2100. Referring to FIG. 25, an exemplary temperature map 2140 is shown wherein the constraint for minimizing differences in weighting functions is utilized. As can be seen in FIG. 25, the temperature regions 2110, 2120, 2130 are now arranged such that the substantial changes in temperature in the map are reduced.

In the method of the current invention, K estimation points that include intersection points 2050 and boundary points 2065 are identified. The values at the estimation points are solved and the method is posed as a constrained least squares problem. The objective it to minimize line fit error relative to the measured mean values. Further, boundary conditions are imposed by an equality criterion. The weight of the basis functions is given by Equation (1):

$$\operatorname*{argmin}_{y_1,\ldots, y_k} \sum_{l=1}^{L} \left\| \frac{1}{T_l} \sum_{x_k \in l} y_k - h_l \right\|^2$$

$$\text{subject to } \begin{cases} y_k = b_k \text{ for } x_k \text{ on boundary} \\ lb \le y_k \le ub \text{ for all } k \end{cases}$$

wherein the measured line temperature averages are given by $h_l$ for each line l. Further, there are $T_l$ estimation points on line l, $y_k$ is the temperature at estimation point $x_k$ and lb and ub are lower and upper bounds, respectively, for $y_k$.

A Gaussian radial basis function (i.e. Gaussian RBF) is then built for each estimation point. The Gaussian RBF is given by Equation (2):

$$e^{-\lambda r^2}$$

wherein r is the distance from a mapping point from the Gaussian RBF center and λ is a scaling factor for the Gaussian RBF. The scaling factor λ is used to adjust a flatness of the Gaussian RBF based on the nearest estimation point wherein the farther the nearest neighbor, the flatter the Gaussian RBF. In particular, the Gaussian RBF is made flatter (i.e. a smaller λ) the further the nearest neighboring base point and narrower (i.e. a larger λ) the closer the nearest the neighboring base point. The weighted sum of all Gaussian RBFs is then used in generating the temperature map.

The constraint for minimizing differences in weighting of basis functions of relatively close seat points may be obtained via Equation (1) by equating $h_l$ to zero and wherein the summation over $y_k$ is made as a difference between neighboring points. Alternatively, the constraint is given by Equation (3):

$$\operatorname*{argmin}_{y_1,\ldots, y_k} \sum_{p=1}^{P} \|y_k - y_p\|^2$$

where there are P close point pairs and $y_p$ corresponds to a point closer to $y_k$ whose difference is to be minimized.

Figure 26:
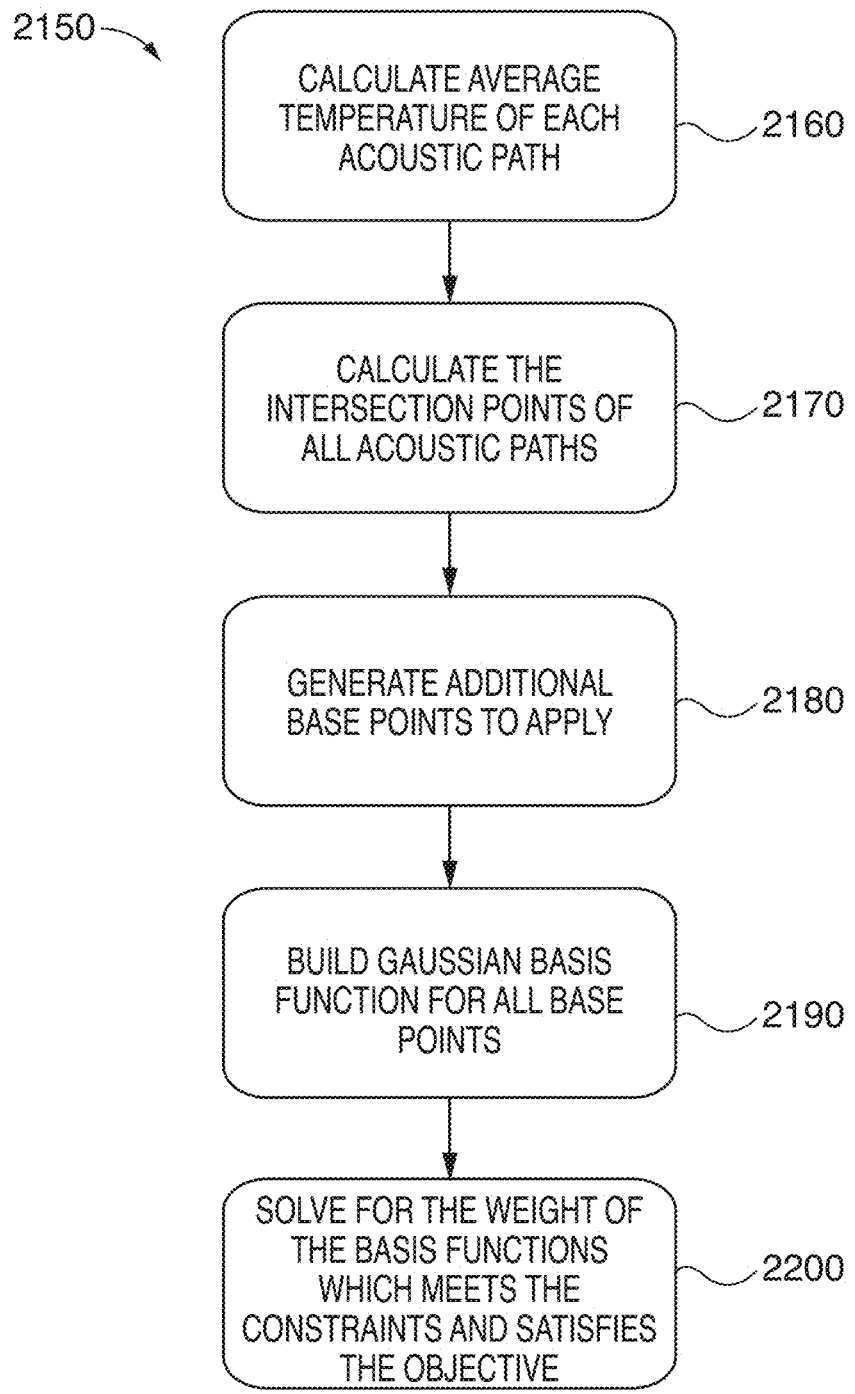
FIG. 26 is a flowchart depicting a method for optimizing a number of base points used in temperature mapping in accordance with the invention.

Referring to FIG. 26, a flowchart 2150 depicting a method for optimizing a number of base points in accordance with the invention is shown. At Step 2160, the average temperature for each acoustic path 2000 is calculated. Next, the intersection points 2050 of all the acoustic paths 2000 are calculated at Step 2170. The intersection points 2050 may be calculated using known geometric operations for calculating the intersection of two line segments. At Step 2180, additional base points are generated to apply apriori information. The additional base points are independent of the base points 2060 generated due to transceiver locations and are generated to include apriori information. For example, if a temperature at a location in the hot gas flow path is known, a base point is added that corresponds to the location. The weight of a Gaussian RBF centered on the added base point is then set equal to the known temperature. In another example, base points may be added to include apriori information regarding known boundary condition information such as a known temperature and/or velocity near the boundary 2015 of the combustor 20. In particular, the temperature near the boundary 2015 is considered when generating a temperature map. Uniformly distributed base points are then generated near the boundary 2015. Weights of Gaussian RBFs centered on each of the generated base points are then set equal to the known wall temperature. Next, Gaussian basis functions are then built for each base point at Step 2190. The method then includes solving for the weight of the Gaussian RBFs which meets the constraints and satisfies the objective at Step 2200. In alternate embodiments, other types of basis functions may be used such as subgaussian, supergaussian, splines and other basis functions. Further, combinations of different types of basis functions may be used. For example, a first type of basis function may be used for boundary points and another type of basis function may be used for intersection points.

The current invention provides a method for generating sparse base points that improves computational speed and enhances temperature map quality and resolution for a hot gas flow path while minimizing the number of transceivers. Further, the current invention enables configuration of the transceivers for use in applications other than gas turbines such as gasifiers.

It has been found that large distortions and reverberations of sound that occur in a gas turbine are additive to background noise already generated in a gas turbine engine. This leads to a plurality of higher correlation peaks at a later point in an acoustic signal which, in turn, causes a large uncertainty in a detected signal time of flight or time delay estimate (TDE) used to measure temperature and mass flow in the gas turbine. As a result, a relatively large error is introduced into the measured quantities of temperature and velocity.

Figure 27:
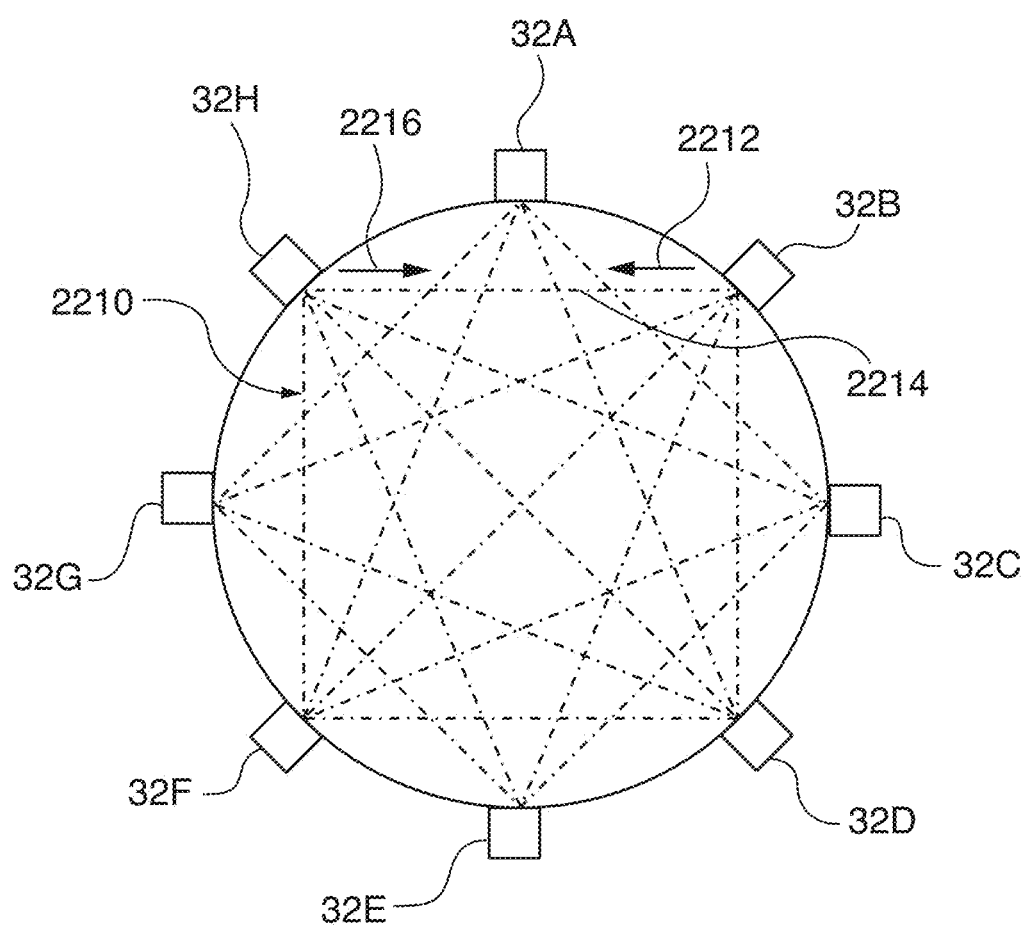
FIG. 27 depicts transceiver/transducers that transmit and receive acoustic signals that define a plurality of acoustic paths.

Referring to FIG. 27, transceiver/transducers 32A-H transmit and receive acoustic signals that define a plurality of acoustic paths 2210 as previously described. Time of flight measurements along corresponding acoustic paths are then used to generate a temperature map such as temperature map 1320 shown in FIG. 13. There are at least two acoustic signals that travel in opposite directions relative to each other along a particular acoustic path between a pair of transducers. In accordance with an aspect of the present invention, the time delay for an acoustic signal traveling in one of the directions is used to detect an error in a time of flight estimation as will be described. In FIG. 27, an exemplary first acoustic signal 2212 is shown traveling in a first direction along a first path 2214 from transducer 32B toward transducer 32H. In addition, an exemplary second acoustic signal 2216 travels in a second direction opposite the first direction along the first path 2214 from transducer 32H toward transducer 32B.

Figure 28A:
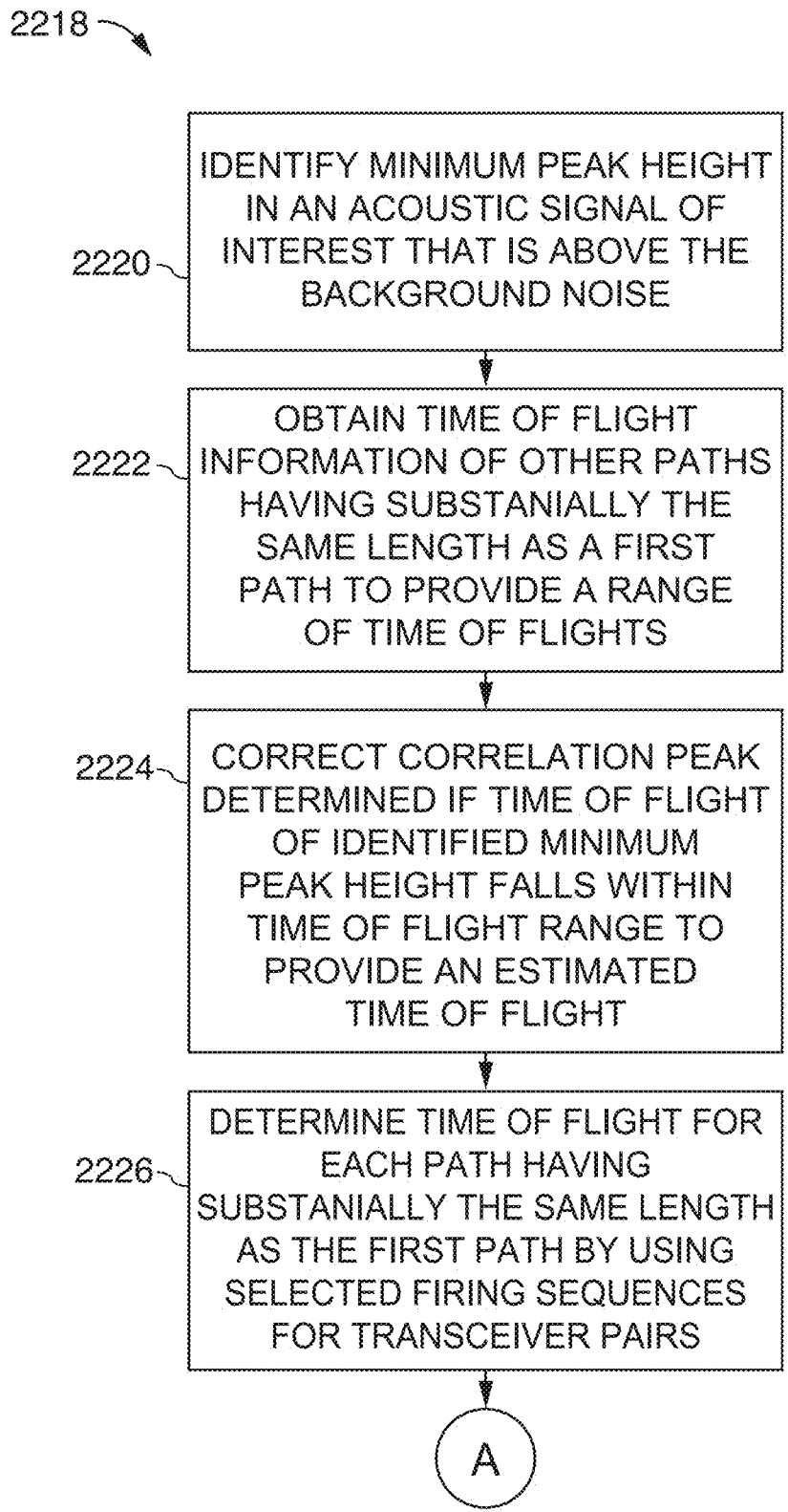
FIGS. 28A-28C illustrate a method for calculating a time of flight in an extreme environment such as that found in a gas turbine exhaust or in gas turbine combustors.
Figure 28B:
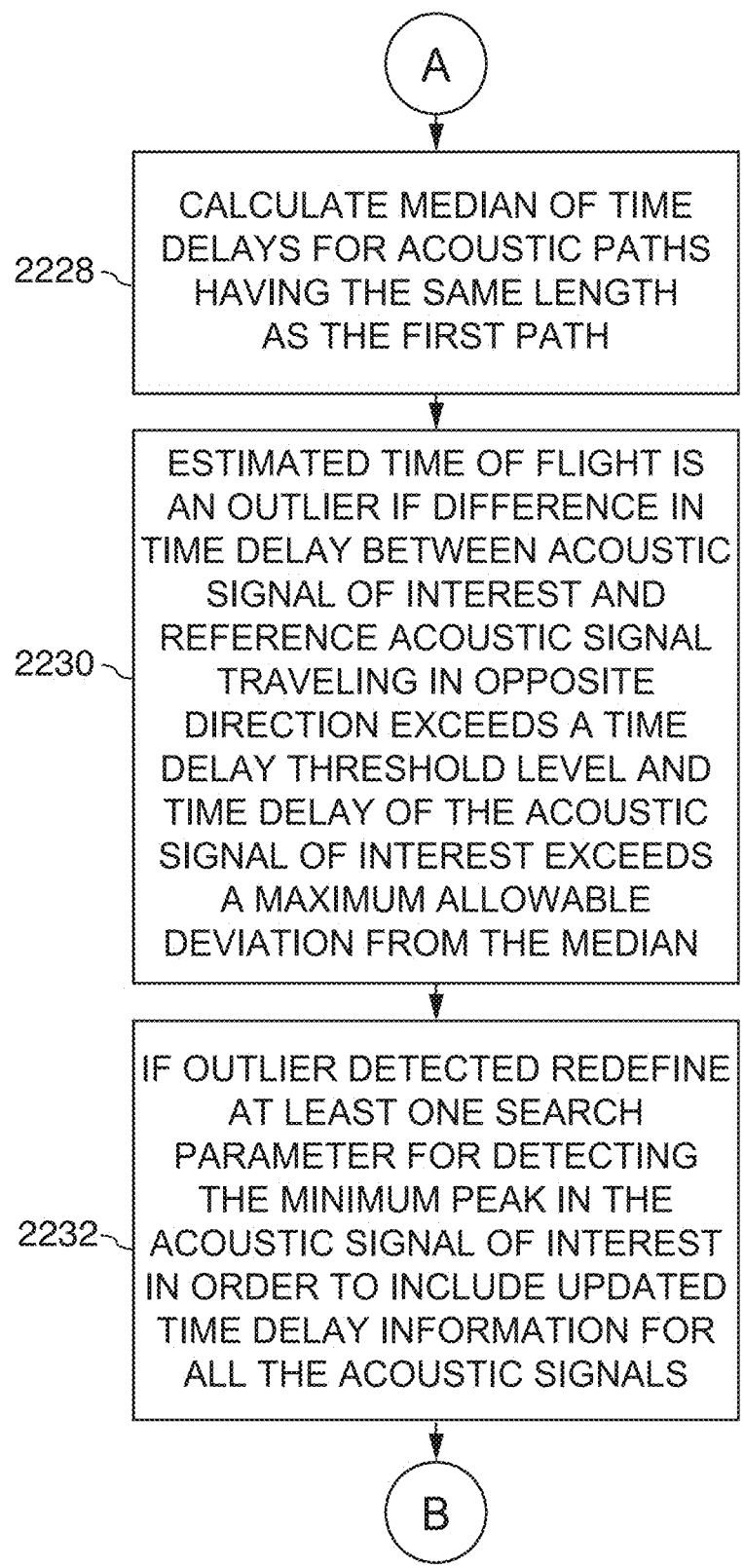
Figure 28C:
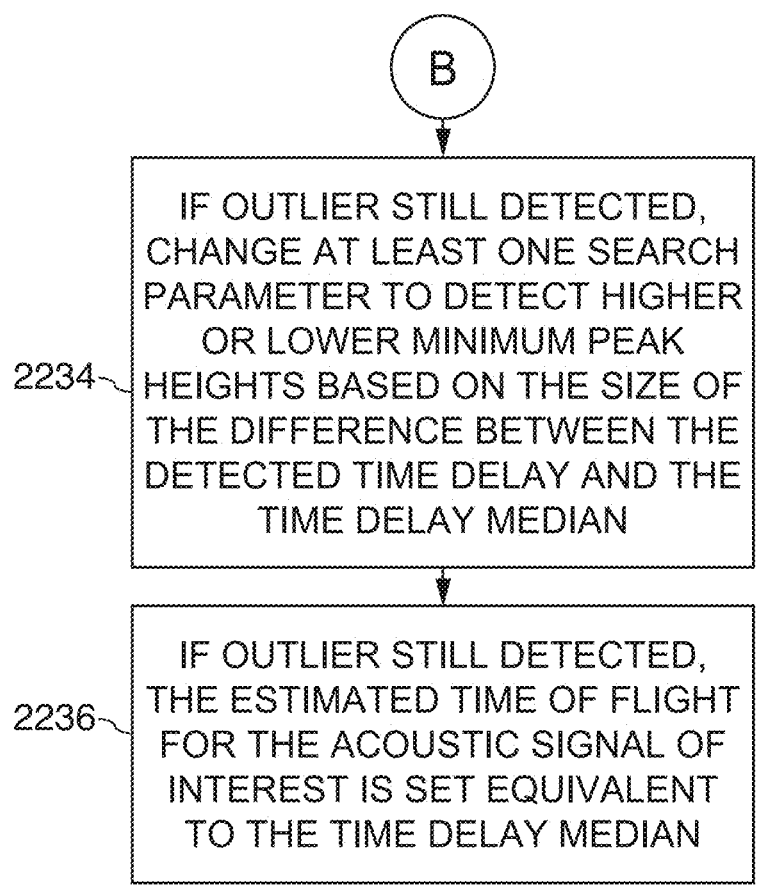

Referring to FIGS. 28A-28C, a method 2218 for estimating a time of flight in an extreme environment such as that found in a gas turbine exhaust or in gas turbine combustors is described. In Step 2220, a minimum peak height in an acoustic signal of interest that is above the background noise is identified. The minimum peak height may be determined, for example, by utilizing software having a functionality for finding values and the location of local maxima in a set of data such as the "findpeaks" function available in MATLAB® computer software supplied by The MathWorks, Inc. of Natick, Mass., US. Due to large distortions and reverberations of sound that occur in a gas turbine, a plurality of potential correlation peaks may be observed in the acoustic signal. Information from the time of flights of other paths (see FIG. 27) having substantially the same length as the first path 2214 is then used to generate a range of time of flights at Step 2222. A correlation peak in the acoustic signal of interest that has a minimum peak height and that has an associated time of flight that falls within the time of flight range is then determined as a correct correlation peak at Step 2224. This results in an estimated time of flight for the acoustic signal of interest that is aligned with the temperature measurement of other paths having substantially the same length as the first path.

The estimated time of flight is then corrected if the estimated time of flight is an outlier as compared to the time of flights of other paths having substantially the same length as the first path. In particular, a time of flight is determined for each path having substantially the same length as the first path by using selected firing sequences of transceiver pairs 32A-32H at step 2226. Next, a median of time delays for the acoustic paths having the same length as the first path is calculated at Step 2228. In accordance with an aspect of the present invention, a difference in time delay between an acoustic signal of interest and an acoustic signal traveling in an opposite direction (i.e. a reference signal) cannot exceed a selected time delay threshold level. In an embodiment, the time delay threshold level may be set equivalent to a selected percentage of the median of time delays. Further, a maximum allowable deviation from the median threshold level is selected. The estimated time of flight is determined to be an outlier if the time delay difference exceeds the time delay threshold level and the time delay of the acoustic signal of interest exceeds the maximum allowable deviation from the median at Step 2230. When an outlier is detected, at least one search parameter for detecting the minimum peak in the acoustic signal of interest is redefined in order to include updated time delay information for the acoustic signals associated with acoustic paths having substantially the same length at Step 2232. An outlier check is again performed to determine if the time delay difference exceeds the time delay threshold level and the time delay of the acoustic signal of interest exceeds the maximum allowable deviation from the median. If an outlier is still detected, at least one search parameter for detecting a first minimum peak is changed so as to detect larger or smaller minimum peak heights that are based on, for example, the size of the difference between the detected time delay and the time delay median at Step 2234. For example, the first minimum peak height may be increased by a factor of 0.5 if a physically impossible or highly improbable short time delay, when compared to the time delay median, is associated with the first minimum peak height. Alternatively, the first minimum peak height may be decreased by a factor of 0.5 if a physically impossible or highly improbable large time delay, when compared to the time delay median, is associated with the first minimum peak height. If an outlier is still detected, the estimated time of flight for the acoustic signal of interest is set equivalent to the time delay median at Step 2236.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. However, the various aspects of the present invention described more fully herein may be applied to other instances where a profile map of values in a region is determined based on average values along linear paths through the region. The invention is capable of other embodiments and of being practiced or of being carried out in various ways. While acoustic and laser sensors are discussed, other measurement techniques may be used. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for estimating a time of flight of an acoustic signal in a hot gas flow path having background noise wherein a plurality of transceivers each generate an acoustic signal, comprising:

providing a first transceiver of the plurality of transceivers and a second transceiver of the plurality of transceivers positioned to define a first path having a first direction from the first transceiver to the second transceiver and a second direction opposite the first direction;

operating the first transceiver to emit an acoustic signal of interest that travels in the first direction;

operating the second transceiver to emit a reference acoustic signal that travels in the second direction;

identifying at least one minimum peak height in the acoustic signal of interest having a peak height that is greater than the background noise;

comparing a time of flight of the acoustic signal of interest to a time of flight of the reference acoustic signal to determine a signal time difference; and obtaining time of flight information of other acoustic paths having substantially the same path length as the first path to provide a range of time of flights wherein a time of flight of the acoustic signal of interest that falls within the time of flight range and is associated with a minimum peak height forms the estimated time of flight;

determining a median of time of flight for acoustic paths that have substantially the same path length as the first path; and determining whether the estimated time of flight is an outlier, wherein the estimated time of flight is an outlier if the signal time difference exceeds a time delay threshold level and a time of flight of the acoustic signal of interest exceeds a maximum allowable deviation from the median, wherein if an outlier is detected, then at least one search parameter for detecting the minimum peak in the acoustic signal of interest is redefined to include updated time of flight information for the acoustic signals associated with acoustic paths having the substantially the same length.

2. The method according to claim 1, wherein if an outlier is detected the estimated time of flight is set equivalent to the median time of flight.

3. A method for estimating a time of flight of an acoustic signal in a hot gas flow path having background noise wherein a plurality of transceivers each generate an acoustic signal, comprising:

providing a first transceiver of the plurality of transceivers and a second transceiver of the plurality of transceivers positioned to define a first path having a first direction from the first transceiver to the second transceiver and a second direction opposite the first direction;

operating the first transceiver to emit an acoustic signal of interest that travels in the first direction;

operating the second transceiver to emit a reference acoustic signal that travels in the second direction;

identifying at least one minimum peak height in the acoustic signal of interest having a peak height that is greater than the background noise;

comparing a time of flight of the acoustic signal of interest to a time of flight of the reference acoustic signal to determine a signal time difference; and obtaining time of flight information of other acoustic paths having substantially the same path length as the first path to provide a range of time of flights wherein a time of flight of the acoustic signal of interest that falls within the time of flight range and is associated with a minimum peak height forms the estimated time of flight;

determining a median of time of flight for acoustic paths that have substantially the same path length as the first path; and determining whether the estimated time of flight is an outlier, wherein the estimated time of flight is an outlier if the signal time difference exceeds a time delay threshold level and a time of flight of the acoustic signal of interest exceeds a maximum allowable deviation from the median, wherein if an outlier is detected, then at least one search parameter is changed to detect higher or lower minimum peak heights based on a size of a difference between a detected time of flight and the median time of flight.

4. The method according to claim 3, wherein a size of a minimum peak to be detected is increased if the difference between the detected time of flight and the median time of flight is relatively short or decreased if the difference between the detected time of flight and the median time of flight is relatively large.

5. A method for estimating a time of flight of an acoustic signal in a hot gas flow path having background noise, comprising:

positioning a plurality of transceivers to define a plurality of acoustic paths between the individual transceivers, each of the plurality of acoustic paths being normal to the hot gas flow path, each transceiver operable to emit an acoustic signal;

activating a first transceiver of the plurality of transceivers to emit an acoustic signal of interest that travels in a first direction toward a second transceiver;

activating the second transceiver of the plurality of transceivers to emit a reference acoustic signal on a first acoustic path of the plurality of acoustic paths in a second direction opposite the first direction;

identifying at least one minimum peak height in the acoustic signal of interest having a peak height that is greater than the background noise;

obtaining time of flight information of the other acoustic paths between each pair of transceivers in the plurality of transceivers, each acoustic path having substantially the same path length as the first path to provide a range of time of flights wherein a time of flight of the acoustic signal of interest that falls within the time of flight range and is associated with a minimum peak height forms the estimated time of flight;

providing a median of time of flights for acoustic paths that have substantially the same path length as the first path;

determining whether the estimated time of flight is an outlier; and changing at least one search parameter for identifying the minimum peak height, and resetting the estimated time of flight to be equivalent to the median of time of flights if the estimated time of flight is an outlier.

6. The method according to claim 5, wherein the estimated time of flight is an outlier if a difference in time of flight between the acoustic signal of interest and the reference acoustic signal exceeds a time of flight threshold level and a time of flight of the acoustic signal of interest exceeds a maximum allowable deviation from the median.

7. The method according to claim 6, wherein if an outlier is detected at least one search parameter for detecting the minimum peak in the acoustic signal of interest is redefined to include updated time of flight information for the acoustic signals associated with acoustic paths having substantially the same length.

8. The method according to claim 6, wherein if an outlier is detected at least one search parameter is changed to detect higher or lower minimum peak heights based on a size of a difference between a detected time of flight and the median time of flight.

9. The method according to claim 8, wherein a size of the minimum peak to be detected is increased if the difference between the detected time of flight and the median time of flight is relatively short or decreased if the difference between the detected time of flight and the median time of flight is relatively large.

10. A method for estimating a time of flight of an acoustic signal in a hot gas flow path having background noise, comprising:

positioning a plurality of transceivers to define a plurality of acoustic paths between the individual transceivers, each of the plurality of acoustic paths being normal to the hot gas flow path, each transceiver operable to emit an acoustic signal;

activating a first transceiver of the plurality of transceivers to emit an acoustic signal of interest that travels in a first direction;

activating a second transceiver of the plurality of transceivers to emit a reference acoustic signal on a first acoustic path in a second direction opposite the first direction;

identifying at least one minimum peak height in the acoustic signal of interest having a peak height that is greater than the background noise;

obtaining time of flight information of the other acoustic paths that extend between the pairs of transceivers in the plurality of transceivers and having substantially the same path length as the first path to provide a range of time of flights wherein a time of flight of the acoustic signal of interest that falls within the time of flight range and is associated with a minimum peak height forms the estimated time of flight;

providing a median of time of flights for the acoustic paths that have substantially the same path length as the first path;

determining whether the estimated time of flight is an outlier by obtaining a difference in time of flight between the acoustic signal of interest and the reference acoustic signal; and changing at least one search parameter for identifying the minimum peak height wherein if the estimated time of flight is an outlier the estimated time of flight is set equivalent to the median of time of flight.

11. The method according to claim 10, wherein the estimated time of flight is an outlier if the difference in time of flight between the acoustic signal of interest and the reference acoustic signal exceeds a time of flight threshold level and a time of flight of the acoustic signal of interest exceeds a maximum allowable deviation from the median.

12. The method according to claim 11, wherein if an outlier is detected at least one search parameter for detecting the minimum peak in the acoustic signal of interest is redefined to include updated time of flight information for the acoustic signals associated with acoustic paths having the substantially the same length.

13. The method according to claim 11, wherein if an outlier is detected at least one search parameter is changed to detect higher or lower minimum peak heights based on a size of a difference between a detected time of flight and the median time of flight.

14. The method according to claim 13, wherein a size of a minimum peak to be detected is increased if the difference between the detected time of flight and the median time of flight is relatively short or decreased if the difference between the detected time of flight and the median time of flight is relatively large.

15. The method according to claim 14, wherein the minimum peak to be detected is increased or decreased by a predetermined factor.

16. The method according to claim 11, wherein the time delay threshold level is equivalent to a percentage of the median of time of flight.

* * * * *